(12) United States Patent
Sekine et al.

(10) Patent No.: US 9,804,364 B2
(45) Date of Patent: Oct. 31, 2017

(54) IMAGE PICKUP LENS

(71) Applicant: KANTATSU CO., LTD., Yaita-Shi, Tochigi (JP)

(72) Inventors: Yukio Sekine, Sukagawa (JP); Tomohiro Yonezawa, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 15/030,766

(22) PCT Filed: Oct. 14, 2014

(86) PCT No.: PCT/JP2014/077359
§ 371 (c)(1),
(2) Date: Apr. 20, 2016

(87) PCT Pub. No.: WO2015/060166
PCT Pub. Date: Apr. 30, 2015

(65) Prior Publication Data
US 2016/0282588 A1    Sep. 29, 2016

(30) Foreign Application Priority Data

Oct. 21, 2013 (JP) ................. 2013-218282

(51) Int. Cl.
*G02B 13/00* (2006.01)
*G02B 9/00* (2006.01)
*G02B 9/62* (2006.01)
*G02B 27/00* (2006.01)

(52) U.S. Cl.
CPC ........... *G02B 13/0045* (2013.01); *G02B 9/00* (2013.01); *G02B 9/62* (2013.01); *G02B 13/00* (2013.01); *G02B 13/001* (2013.01); *G02B 13/002* (2013.01); *G02B 13/0015* (2013.01); *G02B 27/0025* (2013.01)

(58) Field of Classification Search
CPC ............. G02B 13/0045; G02B 13/002; G02B 13/0015; G02B 13/001; G02B 9/62; G02B 9/00; G02B 27/0025
USPC ......................................................... 359/713
See application file for complete search history.

(56) References Cited

U.S. PATENT DOCUMENTS

| | | | | |
|---|---|---|---|---|
| 5,721,643 | A * | 2/1998 | Hagimori | G02B 15/163 359/689 |
| 5,926,321 | A * | 7/1999 | Shikama | G02B 25/001 359/630 |
| 9,201,223 | B2 * | 12/2015 | Ohashi | G02B 15/14 |
| 2005/0014218 | A1 * | 1/2005 | Hagimori | G02B 7/102 435/40.5 |
| 2009/0219630 | A1 * | 9/2009 | Yamamoto | G02B 7/008 359/708 |
| 2010/0046094 | A1 | 2/2010 | Asami | |
| 2011/0249349 | A1 | 10/2011 | Asami | |

(Continued)

*Primary Examiner* — William R Alexander
(74) *Attorney, Agent, or Firm* — Oliff PLC

(57) ABSTRACT

An imaging lens for a solid-state imaging sensor includes, in order from an object side to an image side of the imaging lens, a first through sixth lens. The first lens has positive refractive power. The second lens has positive refractive power. The third lens has negative refractive power. The fourth lens has positive or negative refractive power and aspheric surfaces facing the object side and the image side. The fifth lens has positive refractive power. The sixth lens has negative refractive power and aspheric surfaces facing the object side and the image side.

20 Claims, 32 Drawing Sheets

(56) References Cited

U.S. PATENT DOCUMENTS

| | | | |
|---|---|---|---|
| 2012/0212838 A1* | 8/2012 | Ohashi | G02B 13/0045 359/713 |
| 2012/0314304 A1* | 12/2012 | Huang | G02B 13/0045 359/759 |
| 2013/0016278 A1* | 1/2013 | Matsusaka | G02B 13/18 348/360 |
| 2013/0265649 A1* | 10/2013 | Ohashi | G02B 15/14 359/692 |
| 2014/0043695 A1 | 2/2014 | Hsu et al. | |
| 2014/0078603 A1 | 3/2014 | You | |
| 2014/0092491 A1* | 4/2014 | Hsu | G02B 9/62 359/761 |
| 2014/0293458 A1 | 10/2014 | Nabeta | |
| 2015/0022905 A1 | 1/2015 | Shinohara et al. | |
| 2015/0029599 A1* | 1/2015 | Huang | G02B 3/04 359/713 |
| 2015/0054994 A1* | 2/2015 | Tsai | G02B 3/04 348/294 |
| 2015/0085135 A1* | 3/2015 | Chen | G02B 9/62 348/164 |
| 2015/0098135 A1 | 4/2015 | Chung et al. | |
| 2015/0124332 A1 | 5/2015 | Noda et al. | |
| 2015/0124333 A1 | 5/2015 | Noda et al. | |
| 2015/0131169 A1* | 5/2015 | Asami | G02B 13/0045 359/713 |

\* cited by examiner

IMAGE PICKUP LENS

CROSS REFERENCE TO RELATED APPLICATIONS

This application is the national phase of International Application No. PCT/JP2014/077359, titled "IMAGE PICKUP LENS" filed Oct. 14, 2014, which claims the benefit of priority to Japanese Patent Application No. 2013-218282, titled "IMAGE PICKUP LENS" filed with the Japanese Intellectual Property Office on Oct. 21, 2013, each of which is hereby incorporated by reference in its entirety.

BACKGROUND OF THE INVENTION

Field of the Invention

The present invention relates to an imaging lens which forms an image of an object on a solid-state imaging sensor such as a CCD sensor or C-MOS sensor used in a compact image pickup device. More particularly, the present invention relates to an imaging lens which is built in an image pickup device mounted in high-functional products such as smart TV and 4K TV, information terminal devices such as game console and PC, and mobile terminal devices such as smart phone, mobile phone, and PDA (Personal Digital Assistant).

Description of the Related Art

In recent years, there has been noticed high functional products such as smart TV to which functions of PC is added, and 4K TV having resolution four times as much as full HD and pursuing high image quality. Since smart TV is becoming multi-functional in addition to high functionalization, development in the future in this field is especially expected. As one of the function, there is provided function for mounting image pickup device and taking videos and images, and communicating. By using this function, for example, various applications is expected such as high precision people meter using TV phone and facial recognition technology, furthermore, security measure and monitoring pets by mounting motion detection function, and others. Moreover, high resolution as 4K TV enables people to enjoy realistic movies which they feel from obtained images as if actual objects exist there. Such function is expected to be more popularized than usual by appearance of smart TV and so on. On the other hand, recently, the products such as digital photo frame on which camera function is mounted are sold, and it is thought that the market of camera will more expanded.

If communication is made by using TV phone, for example, information such as face expression of a speaker and situation around is important in television conference to which a plurality of people attend. Also, if faces of a human being and an animal are recognized by using facial recognition technology, it is desirable that the faces are recognized extremely precisely. The imaging lens is anticipated to provide high resolution, compactness, a wide field of view and high brightness for the imaging lens applied to devices having high resolution.

However, it is difficult for the conventional technology to fully meet such demand. In the Conventional art, as for image pickup devices incorporated into a mobile terminal device such as smart phone, imaging sensors of about 1/3.2 to ¼ inch which are appropriate for compactness of the devices are mainly used, and the number of pixels was mainly 5,000,000 to 8,000,000. Also, applied imaging lens has been required to be compactness appropriate for its size and to have resolution performance corresponding to the number of pixels of imaging sensor. On the other hand, relatively large imaging sensors of less than ½ inch are applied to image pickup devices incorporated into high-functional products such as smart TV and 4K TV which pursue much higher resolution than that of conventional full HD TV. For example, if the imaging sensor has size of 1/1.5 inch and its pixel pitch is 1.4 micron, the number of pixels will be 35,000,000, and it becomes possible to apply to the resolution performance of the product. When the conventional imaging lens is applied to such a large imaging sensor, if scaling and enlargement of the optical system are made, there is raised the problem of deterioration of aberrations accompanying the enlargement of optical system. That is, it becomes very difficult to maintain proper high optical performance which has no problem in the conventional compact imaging sensor. Moreover, recently, not only high-functional products but also mobile terminal devices are requested to have a wide field of view. Conventionally, a field of view was generally about 70 to 80 degrees, and correction of aberration has been properly carried out within the imaging angle. When wider imaging angle is provided, however, correction of aberration in peripheral area is very difficult and there will be raised problem that high optical performance is not ensured.

As the imaging lens built in products with image pickup devices, for example, the imaging lens described in Patent Literature 1 and Patent Literature 2 are known.

Patent Literature 1 discloses an imaging lens which includes, in order from an object side, a first lens having positive refractive power and a convex surface on the object side near the optical axis, a second lens having negative refractive power, a third lens having positive refractive power and a concave surface on the image side near the optical axis, a fourth lens having positive refractive power and a convex surface on the image side near the optical axis, and a fifth lens having negative refractive power near the optical axis. The imaging lens described in Patent Literature 1 is to achieve high-functionalization by providing the five constituent lenses and achieving optimization of each constituent lens.

Patent Literature 2 discloses an imaging lens in which in order from an object side, there are arranged a first lens group having positive refractive power, a second lens group having negative refractive power, a third lens group having positive refractive power, a fourth lens group having negative refractive power, a fifth lens group having positive refractive power, and a sixth lens group having negative refractive power. The imaging lens described in Patent Literature 2 that lens configuration in optical system is designed as concentric to an aperture stop, and astigmatism and coma aberrations are suppressed and a wide field of view is achieved.

Patent Literature

Patent Literature 1: JP-A-2010-262270
Patent Literature 2: JP-A-2012-155223

SUMMARY OF THE INVENTION

The imaging lens described in Patent Literature 1 provides high brightness with an F-value of 2.0 and a half field of view of about 38 degrees and achieves relatively wide lens system. If the imaging lens is applied to a large imaging sensor, it becomes necessary to further suppress various aberrations, however, there is a limitation in correction of aberration in the five-lens constituent and it is difficult to apply to devices in which high resolution progresses.

The imaging lens described in Patent Literature 2 provides high brightness with an F-value of about 2.3 and achieves proper correction of aberrations. However, the half field of view is about 33 degrees, and it is impossible to fully achieve high optical performance. If a wide field of view is to be achieved by using lens constituent described in Patent Literature 2, correction of aberration in peripheral area is especially difficult and it is not possible to obtain high optical performance.

Thus, in the conventional technology, it is difficult to meet the demand for high resolution, compactness, a wide field of view and high brightness at the same time, and if it is applied to a large imaging sensor, it is also difficult to achieve high optical performance.

The present invention has been made in view of the above problem, and an object of the present invention is to provide a compact imaging lens achieving higher optical performance than conventional arts, having a wide field of view and enabling proper correction of aberration if application is made to not only a conventional compact imaging sensor but a large imaging sensor.

Herein, "compactness of an imaging lens" is defined that TTL/2ih is less than 1.0, where a total track length is denoted as TTL and effective imaging plane of the imaging sensor is denoted as 2ih. "Total track length" is defined as the distance on the optical axis from the object-side surface of an optical element nearest to the object to the imaging plane, when a filter disposed between the imaging lens and the imaging sensor in the optical system is removed. Moreover, a diagonal length of the effective imaging plane of the imaging sensor is equal to the vertical height from an optical axis to the point where a light ray incident on the imaging lens at a maximum field of view enters the imaging plane, namely to a diameter of an effective image circle, of which the maximum image height is a radius.

According to an aspect of the present invention, there is provided an imaging lens for a solid-state imaging sensor, which includes, in order from an object side to an image side, a first lens having positive or negative refractive power, a second lens having positive refractive power, a third lens having negative refractive power, a fourth lens having positive or negative refractive power and aspheric surfaces on the both sides, a fifth lens having positive refractive power, and a sixth lens having negative refractive power having aspheric surfaces on the both sides, and satisfies a conditional expression (1) below:

$$0.84 < |r1/f| \quad (1)$$

where f denotes the focal length of the overall optical system of the imaging lens and r1 denotes the curvature radius of the object-side surface of the first lens.

The imaging lens of the above configuration includes the first lens for correction of aberrations with weak positive or negative refractive power, and the lens group which is constituent of the second lens to the sixth lens. The lens group of the second lens to the sixth lens is a telephoto type and includes, from the object side, the positive second lens, the negative third lens, the positive or negative fourth lens, the positive fifth lens, and the negative sixth lens, and it is advantageous for shortening the total track length.

The imaging lens of the above configuration achieves compactness of the imaging lens by providing strong positive refractive power with the second lens. In this case, however, extremely large spherical aberration in a direction toward the second lens is inevitable. According to the present invention, the first lens has relative weak positive or negative refractive power and a value of curvature radius is properly defined, and this problem is solved by having extremely large spherical aberration in a directing apart from in advance. The first lens functions to suppress the influence on the refractive power of the overall optical system, prevents the optical system from enlargement, and functions so as to neutralize the spherical aberration on the second lens.

The third lens having negative refractive power more properly corrects the chromatic aberrations of the first and second lenses.

The fourth lens has relative weaker positive or negative refractive power than the other constituent imaging lens, and properly corrects mainly astigmatism, coma aberrations and spherical aberrations, since the both surfaces are aspherical. The fifth lens has strong positive refractive power and achieves a short total track length with the second lens having strong positive refractive power.

The sixth lens having negative refractive power facilitates securing back focus, and provides aspheric surfaces on the object side and the image side, and obtains effect to correct distortion and field curvature and to control the angle of light rays incident on the imaging sensors.

The conditional expression (1) defines an appropriate range for the ratio of the curvature radius of the object-side surface of the first lens to the focal length of the overall optical system of the imaging lens. If the value is below the lower limit of the conditional expression (1), the curvature radius of the object-side surface of the first lens would be too small, and the coma aberrations might increase, in addition to the correcting effect to the spherical aberrations being lowered. Also, it is not desirable to adopt a concave surface to the object-side surface of the first lens, because edge thickness of the peripheral area of the lens is increased and it would be difficult to achieve compactness of the imaging lens.

Preferably, if the first lens has positive refractive power, the imaging lens of the above configuration satisfies a conditional expression (2) below:

$$1.0 < f1/f \quad (2)$$

where f denotes the focal length of the overall optical system of the imaging lens and f1 denotes the focal length of the first lens.

If the first lens has positive refractive power, the conditional expression (2) defines an appropriate range for the ratio of the positive refractive power of the first lens to the refractive power of the overall optical system of the imaging lens. If the conditional expression (2) is satisfied, spherical aberrations and coma aberrations are properly corrected while the influence on the refractive power of the overall optical system of the imaging lens is suppressed.

Also, preferably, if the first lens has negative refractive power, the imaging lens of the above configuration satisfies a conditional expression (3) below:

$$f1/f < -5.0 \quad (3)$$

where f denotes the focal length of the overall optical system of the imaging lens and f1 denotes the focal length of the first lens.

If the first lens has negative refractive power, the conditional expression (3) defines an appropriate range for the ratio of the negative refractive power of the first lens to the refractive power of the overall optical system of the imaging lens. If the conditional expression (3) is satisfied, spherical aberrations and coma aberrations are properly corrected while the influence on the refractive power of the overall optical system of the imaging lens is suppressed.

Also, preferably, the second lens has biconvex surface, and the imaging lens of the above configuration satisfies a conditional expression (4) below:

$$-0.40 < (r3+r4)/(r3-r4) < 0.90 \tag{4}$$

where r3 denotes the curvature radius of the object-side surface of the second lens and r4 denotes the curvature radius of the image-side surface of the second lens.

When the second lens has biconvex shape, strong positive refractive power is generated by the convex surfaces of the object-side surface and the image-side surface, the second lens contributes to shortening of the total track length.

The conditional expression (4) defines shapes of the object side surface and the image-side surface of the second lens. In the range of the conditional expression (4), increase of tolerance sensitivity of each lens surface can be suppressed. Occurrence of excessive spherical aberrations on the second lens can be also suppressed.

Also, in the imaging lens of the above configuration, the third lens preferably has negative refractive power and a concave surface on the image side, and both surfaces are aspheric surfaces.

The negative refractive power of the third lens and the aspheric surfaces on the both sides extremely properly correct chromatic aberrations on the first and second lenses.

Also, preferably, the imaging lens of the above configuration satisfies a conditional expression (5) below:

$$0.8 < |f4/f| \tag{5}$$

where f denotes the focal length of the overall optical system of the imaging lens and f4 denotes the focal length of the fourth lens.

The conditional expression (5) defines an appropriate range for the ratio of the refractive power of the fourth lens to the refractive power of the overall optical system of the imaging lens, and indicates a condition to achieve proper correction of aberrations. If the value is below the lower limit of the conditional expression (5), the refractive power of the fourth lens would be too strong, and especially, astigmatism and coma aberrations would deteriorate.

Also, in the imaging lens of the above configuration, the fifth lens preferably has a convex shape on the image side, and both surfaces are aspheric surfaces.

The convex shape on the image side of the fifth lens and the aspheric surfaces on the both surfaces make it easy to suppress an emission angle of an off-axial light ray emitted from the fifth lens and enter the sixth lens, and thereby various off-axial aberrations, in particular astigmatism, and field curvature are properly corrected. Also, in the constituent lenses of the imaging lens, the fifth lens has relatively strong positive refractive power, and compactness of the imaging lens is achieved by appropriately balancing with the strong positive refractive power of the second lens.

Also, preferably, in the imaging lens of the above configuration, the object-side surface of the sixth lens has a concave surface on the image side, and has an aspheric surface with a pole point off the optical axis.

The sixth lens easily secures back focus by having the concave surface on the image side. Also, by having an aspheric surface with a pole point off the optical axis, the surface of the lens is made as that negative refractive power is changed to positive refractive power toward peripheral area of the lens. The aspheric surface with such change of shape mainly has an effect for correcting distortion and field curvature, and an effect for controlling angles of light ray incident on the imaging sensor.

As for the surface shape of the lens, a convex or concave surface is defined as a lens surface whose paraxial portion (portion near the optical axis) is convex or concave. Also, a pole point provided on the aspheric surface is defined as a point on an aspheric surface at which a tangential plane intersects the optical axis perpendicularly.

Also, preferably, the imaging lens of the above configuration satisfies conditional expressions (6) to (8) below:

$$50 < vd1 < 80 \tag{6}$$

$$50 < vd2 < 80 \tag{7}$$

$$20 < vd3 < 30 \tag{8}$$

where vd1 denotes the Abbe number of the first lens at d-ray, vd2 denotes the Abbe number of the second lens at d-ray and vd3 denotes the Abbe number of the third lens at d-ray.

The conditional expressions (6) to (8) define the Abbe number of the first, second and third lenses. When a low-dispersion material is adopted for the first and second lenses and a high-dispersion material is adopted for the third lens, chromatic aberrations are corrected properly.

Also, preferably, the imaging lens of the above configuration satisfies conditional expressions (9) to (11) below:

$$20 < vd4 < 30 \tag{9}$$

$$50 < vd5 < 80 \tag{10}$$

$$50 < vd6 < 80 \tag{11}$$

where vd4 denotes the Abbe number of the fourth lens at d-ray, vd5 denotes the Abbe number of the fifth lens at d-ray and vd6 denotes the Abbe number of the sixth lens at d-ray.

The conditional expressions (9) to (11) define the Abbe number of the fourth, fifth and sixth lenses. When a high-dispersion material is adopted for the fourth lens and a low-dispersion material is adopted for the fifth and sixth lenses, chromatic aberrations are corrected properly.

If the conditional expressions (6) to (11) are satisfied at the same time, since the chromatic aberrations of the first and second lenses can be corrected at the third lens, and the chromatic aberrations of the fifth and sixth lens can be corrected at the fourth lens, in the overall imaging lens, axial chromatic aberrations and magnification chromatic aberrations are corrected more properly.

If the fourth lens has positive refractive power, the fifth lens has positive refractive power, and the sixth lens has negative refractive power, the imaging lens of the above configuration preferably satisfies conditional expressions (9-1) to (11-1).

$$50 < vd4 < 60 \tag{9-1}$$

$$20 < vd5 < 60 \tag{10-1}$$

$$20 < vd6 < 60 \tag{11-1}$$

Satisfying the conditional expressions (9-1), (10-1) and (11-1) realizes proper correction of chromatic aberrations.

Also, preferably, the imaging lens of the above configuration satisfies a conditional expression (12) below:

$$0.8 < ih/f < 1.1 \tag{12}$$

where f denotes the focal length of the overall optical system of the imaging lens and ih denotes maximum image height.

The conditional expression (12) defines the ratio of the focal length of the overall optical system of the imaging lens to the maximum image height, and indicates a condition to achieve a wide field of view and high imaging performance. If the value is above the upper limit of the conditional expression (12), field of view would be too wide, correction of aberrations in the peripheral areas becomes extremely difficult, and deterioration in the optical performance would be caused. On the other hand, if the value is below the lower limit of the conditional expression (12), the focal length of the overall optical system of the imaging lens would be too long, and it becomes difficult to achieve compactness and disadvantageous for achieving a wide field of view.

Also, preferably, the imaging lens of the above configuration satisfies a conditional expression (13) below:

$$-1.7 < f2/f3 < -0.5 \tag{13}$$

where f2 denotes the focal length of the second lens and f3 denotes the focal length of the third lens.

The conditional expression (13) indicates a condition to properly balance the refractive power of the second lens and the refractive power of the third lens. If the value is above the upper limit of the conditional expression (13), the positive refractive power of the second lens would be too strong, and it would be advantageous for achieving a short total track length, but spherical aberrations and chromatic aberrations increase and it would be difficult to correct aberrations properly. On the other hand, if the value is below the lower limit of the conditional expression (13), the positive refractive power of the second lens would be too week, and it would be difficult to achieve a short total track length. The total track length is shortened and spherical aberrations and chromatic aberrations are corrected properly in the range of the conditional expression (13).

Also, preferably, the imaging lens of the above configuration satisfies a conditional expression (14) below:

$$-2.3 < f5/f6 < -0.6 \tag{14}$$

where f5 denotes the focal length of the fifth lens and f6 denotes the focal length of the sixth lens.

The conditional expression (14) indicates a condition to properly balance the refractive power of the fifth lens and the refractive power of the sixth lens. By setting the value in the range of the conditional expression (14), namely by setting the refractive power of the fifth and sixth lens to be same, it would be possible to achieve a short total track length and correct astigmatism and field curvature in a good balance.

Also, preferably, an aperture stop is located between the image-side surface of the first lens and the object-side surface of the third lens. If an aperture stop is located as above and the front side surface and the back side surface between which the aperture stop is interposed are designed as a symmetric shape, the aberrations of the surfaces would be neutralized and it would be advantageous for correcting the aberrations for a wide field of angle. Also, it would be easy to control the angle of main light rays incident to the imaging sensor, and to achieve high brightness.

According to the present invention, there is provided a bright and compact imaging lens which is applied to a conventional compact imaging sensor and enables preferable correction of various aberrations as having a wide field of view, even when applied to a large imaging sensor.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, 15, 17, 19, 21, 23, 25, 27, 29, and 31 are schematic views showing the general configurations of the imaging lenses in Examples 1 to 16 according to this embodiment, respectively. Since all these examples have the same basic lens configuration, the general configuration of an imaging lens according to this embodiment is explained below mainly referring to the schematic view of Example 1.

Figure 1:
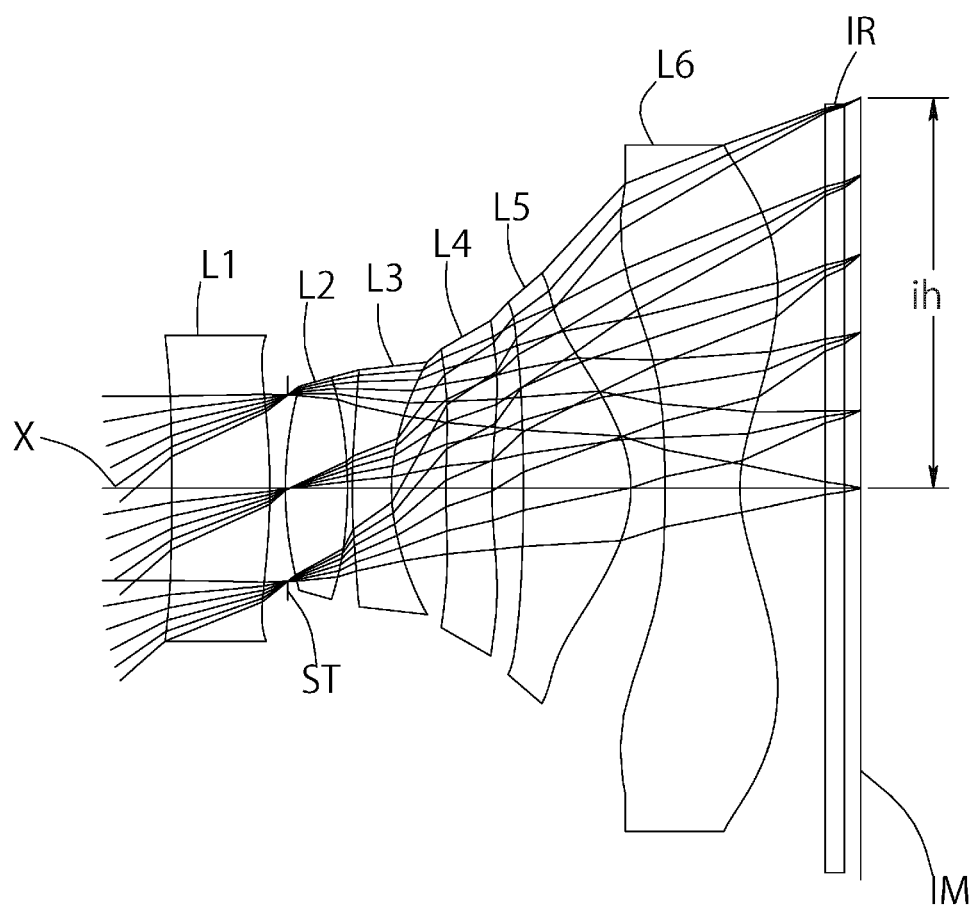
FIG. 1 is a schematic view showing the general configuration of an imaging lens in Example 1.

As shown in FIG. 1, the imaging lens according to this embodiment includes, in order from an object side to an image side, a first lens L1 with positive refractive power, an aperture stop ST, a second lens L2 with positive refractive power, a third lens L3 with negative refractive power, a fourth lens L4 with positive refractive power, a fifth lens L5 with positive refractive power, and a sixth lens L6 with negative refractive power.

A filter IR is arranged between the sixth lens L6 and an imaging plane IM. The filter IR is omissible.

In the imaging lens of the preferred embodiment, the first lens L1 has relatively weak positive refractive power in the imaging lens, and has a meniscus shape and concave surface on the object side. The lens has an advantageous configuration for achieving a wide field of view by forming the object-side surface as a large curvature radius and taking incident light rays from a wide angle. Also, by setting the refractive power weak and positive, spherical aberrations and coma aberrations of the second lens L2 are properly corrected as reducing an influence on the refractive power of the overall optical system of the imaging lens. The shape and refractive power of the first lens L1 is not limited to the embodiment of the Example 1, and is set as a proper shape and refractive power according to the refractive power and shape of the lens group arranged closer to the image side than the first lens L1. It is important that the first lens L1 have a function to neutralize spherical aberrations toward a minus direction of the second lens L2, and the first lens preferably has positive or negative refractive power having such a function. For example, the Examples 1 to 8 and 11 are examples in which weak positive refractive power is set for the first lens L1, and the Examples 9 and 10 are examples in which weak negative refractive power is set for the first lens L1. Also, it is possible to adopt various shapes. For example, the Example 10 is an example in which the first lens L1 as a meniscus shape has a convex surface with a large curvature radius on the object-side, and the Examples 11, 15 and 16 is examples in which the first lens L1 has a biconvex shape with a large curvature radius on the object-side surface. In all of the Examples, the both sides of the first lens L1 have proper aspheric surfaces, and aberrations are corrected more effectively.

The second lens L2 has a biconvex shape with a convex surface both on the object-side surface and the image-side surface, a short total track length is achieved by generating strong positive refractive power on t the convex surfaces on the object-side and image-side. Also, the third lens as a meniscus lens has negative refractive power and a convex surface on the object-side and a concave surface on the image-side, and corrects chromatic aberrations of the first lens L1 and the second lens L2. It is possible to adopt various shapes for the third lens L3. For example, Example 12, Example 15 and Example 16 are examples in which the third lens L3 has a biconcave shape on the both surfaces, and Example 13 and Example 14 are examples in which the third lens L3 as a meniscus shape has a concave surface on the object-side and a convex surface on the image-side. If the object-side surface of the third lens L3 is a concave surface, the polarization angle of a light ray which is emitted from the convex surface of the image side of the second lens L2 and passes through the surface can be relatively suppressed.

Therefore, the third lens L3 properly corrects chromatic aberrations of the first lens L1 and the second lens L2 while mainly preventing coma aberrations and astigmatism.

The fourth lens L4 as a meniscus shape has aspheric surfaces on both sides with relatively weak negative refractive power, and a convex surface on the object-side and a concave surface on the image-side, and mainly corrects astigmatism, coma aberrations and spherical aberrations. Since the fourth lens correct aberrations, the shape thereof differs depending on aberration to be corrected. For example, the Example 4 and the Example 5 are examples of biconcave shape, in which the N Example 12, the Example 15 and the Example 16 are examples of biconvex shape, and the Example 13 and the Example 14 are examples as a meniscus shape having a convex surface on the image side. If a biconcave shape is adopted, it is possible to correct spherical aberrations and axial chromatic aberrations as well.

The fifth lens L5 as a meniscus shape has positive refractive power and a concave surface on the object side and a convex surface on the image side, and the positive refractive power is strong and a short total track length is achieved as well as the second lens L2. Also, the fifth lens L5 has an aspheric surface of which the positive refractive power is weakened toward the peripheral area of the lens, and that makes it easy to suppress an emission angle of an off-axial light ray emitted from the fifth lens L5 and enter the sixth lens L6. Thereby, various off-axial aberrations, in particular astigmatism, and field curvature are properly corrected. The fifth lens L5 has a convex surface on the image side, and an aspheric surface may be made of which positive refractive power is weakened toward the peripheral area of the lens. The fifth lens L5 may be made as a biconvex shape with a convex surface on the object side as well as Example 4.

The sixth lens L6 has a biconcave shape having concave surfaces on both of the object side and the image side. The sixth lens L6 easily secures back focus by arranging a lens having negative refractive power at the nearest position to the image side. Also, on the object-side surface and the image-side surface, the sixth lens L6 has aspheric surfaces with a pole point off the optical axis X. The refractive power of the sixth lens L6 having such aspheric surfaces becomes negative refractive power near the optical axis X. However, the refractive power continuously changes as the negative refractive power is weakened toward the peripheral area of the lens, and becomes positive refractive power in the peripheral area of the lens. By properly changing refractive power, distortion and field curvature are properly corrected. The sixth lens L6 may have a shape which enables to secure proper back focus and to obtain an effect for correction of distortion and field curvature, and as shown in the Examples 4 to 16, the sixth lens L6 may have a meniscus shape with a convex surface on the object side. In this case, if the object-side surface of the sixth lens L6 has an aspheric surface with at least one pole point off the optical axis X, astigmatism may be easily reduced and contribution is made to improvement of image quality in the peripheral area of the lens.

Also, in FIG. 1, an aperture stop ST is arranged between the first lens L1 and the second lens L2, and both opposite surfaces interposing the aperture stop ST have a convex surface each other. As an aberration of each surface is easily neutralized by interposing the aperture stop ST, it would be advantageous for a wide field of view and high brightness. As shown in the Example 10 and the Example 11, when an aperture stop ST is arranged between the image-side surface of the second lens L2 and the object-side surface of the third lens L3, opposite surfaces interposing the aperture stop ST are convex each other in a similar manner, and the similar effect is obtained. When the aperture stop is arranged closer to the image side than the third lens L3, an exit pupil position is moved toward the image side and it becomes difficult to control the incident angle of a main light ray to an imaging sensor. If the incident angle takes precedence, it is not desirable as the total track length becomes long accordingly.

According to this embodiment, all the constituent lenses of the imaging lens are made of plastic material, and the manufacturing process is facilitated and mass production at low cost can be achieved. Also, in this embodiment, all the lens surfaces are made as aspheric shapes, and proper correction of aberrations can be achieved.

As Materials for the lens, a glass material can be used when further enhancement of performance is desirable. Also, a spherical surface which is easy in manufacturing may be adopted for the lens surface depending on the required performance.

When the imaging lens according to this embodiment satisfies conditional expressions (1) to (14) below, it brings about advantageous effects:

$$0.84 < |r1/f| \tag{1}$$

$$1.0 \leq f1/f \tag{2}$$

$$f1/f < -5.0 \tag{3}$$

$$-0.40 < (r3+r4)/(r3-r4) < 0.90 \tag{4}$$

$$0.8 < |f4/f| \tag{5}$$

$$50 < vd1 < 80 \tag{6}$$

$$50 < vd2 < 80 \tag{7}$$

$$20 < vd3 < 30 \tag{8}$$

$$20 < vd4 < 30 \tag{9}$$

$$50 < vd4 < 60 \tag{9-1}$$

$$50 < vd5 < 80 \tag{10}$$

$$20 < vd5 < 60 \tag{10-1}$$

$$50 < vd6 < 80 \tag{11}$$

$$20 < vd6 < 60 \tag{11-1}$$

$$0.8 < ih/f < 1.1 \tag{12}$$

$$-1.7 < f2/f3 < -0.5 \tag{13}$$

$$-2.3 < f5/f6 < -0.6 \tag{14}$$

where
f: focal length of the overall optical system of the imaging lens
f1: focal length of the first lens L1
f2: focal length of the second lens L2
f3: focal length of the third lens L3
f4: focal length of the fourth lens L4
f5: focal length of the fifth lens L5
f6: focal length of the sixth lens L6
r1: curvature radius of the object-side surface of the first lens L1
r3: curvature radius of the object-side surface of the second lens L2
r4: curvature radius of the image-side surface of the second lens L2
vd1: Abbe number of the first lens L1 at d-ray
vd2: Abbe number of the second lens L2 at d-ray
vd3: Abbe number of the third lens L3 at d-ray
vd4: Abbe number of the fourth lens L4 at d-ray
vd5: Abbe number of the fifth lens L5 at d-ray
vd6: Abbe number of the sixth lens L6 at d-ray
ih: maximum image height.

When the imaging lens according to this embodiment satisfies conditional expressions (1a) to (14a) below, it brings about more advantageous effects:

$$0.84 \leq |r1/f| \tag{1a}$$

$$1.2 \leq f1/f \tag{2a}$$

$$f1/f < -7.0 \tag{3a}$$

$$-0.40 < (r3+r4)/(r3-r4) < 0.85 \tag{4a}$$

$$1.0 < |f4/f| \tag{5a}$$

$$50 < vd1 < 65 \tag{6a}$$

$$50 < vd2 < 65 \tag{7a}$$

$$20 < vd3 < 28 \tag{8a}$$

$$20 < vd4 < 28 \tag{9a}$$

$$52 < vd4 < 58 \tag{9-1a}$$

$$50 < vd5 < 65 \tag{10a}$$

$$20 < vd5 < 58 \tag{10-1a}$$

$$50 < vd6 < 65 \tag{11a}$$

$$20 < vd6 < 58 \tag{11-1a}$$

$$0.85 < ih/f < 1.1 \tag{12a}$$

$$-1.68 \leq f2/f3 < -0.5 \tag{13a}$$

$$-2.2 < f5/f6 < -0.70 \tag{14a}$$

The signs in the above conditional expressions have the same meanings as those in the preceding paragraph.

When the imaging lens according to this embodiment satisfies conditional expressions (1b) to (14b) below, it brings about particularly advantageous effects:

$$0.85 \leq |r1/f| \tag{1b}$$

$$1.25 \leq f1/f \tag{2b}$$

$$f1/f \leq -7.8 \tag{3b}$$

$$-0.39 \leq (r3+r4)/(r3-r4) 30.83 \tag{4b}$$

$$1.0 \leq |f4/f| \tag{5b}$$

$$50 < vd1 < 60 \tag{6b}$$

$$50 < vd2 < 60 \tag{7b}$$

$$22 < vd3 < 28 \tag{8b}$$

$$22 < vd4 < 28 \tag{9b}$$

$$54 < vd4 < 58 \tag{9-1b}$$

$$50 < vd5 < 60 \tag{10b}$$

$22<vd5<58$ (10-1b)

$50<vd6<60$ (11b)

$22<vd6<58$ (11-1b)

$0.86 \leq ih/f \leq 1.0$ (12b)

$-1.66 \leq f2/f3 \leq -0.52$ (13b)

$-2.1 \leq f5/f6 \leq -0.7$ (14b)

The signs in the above conditional expressions have the same meanings as those in the paragraph before the preceding paragraph.

In this embodiment, the aspheric shapes of the lens surfaces are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ Equation 1

Next, Examples of the imaging lens according to this embodiment will be explained. In each example, f denotes the focal length of the overall optical system of the imaging lens, Fno denotes an F-number, ω denotes a half field of view, and ih denotes maximum image height. i denotes a surface number counted from the object side, r denotes a curvature radius, d denotes the distance on the optical axis between lens surfaces (axial surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

EXAMPLE 1

The basic lens data is shown below in Table 1.

TABLE 1

Numerical Data Example 1

Unit mm f = 6.787
Fno = 2.40
ω(°) = 41.2
ih = 5.980

Surface Data

| Surface Number i | Curvature Radius r | Surface Distance d | Refractive Index Nd | Abbe Number vd |
|---|---|---|---|---|
| (Object) | Infinity | Infinity | | |
| 1* | −124.740 | 1.501 | 1.5438 | 55.57 |
| 2* | −10.827 | 0.276 | | |
| 3(Stop) | Infinity | −0.036 | | |
| 4* | 5.966 | 0.948 | 1.5438 | 55.57 |
| 5* | −6.359 | 0.073 | | |
| 6* | 10.079 | 0.600 | 1.6142 | 25.58 |
| 7* | 3.000 | 0.834 | | |
| 8* | 11.941 | 0.700 | 1.6142 | 25.58 |
| 9* | 6.908 | 0.487 | | |
| 10* | −23.730 | 1.640 | 1.5346 | 56.16 |
| 11* | −1.971 | 0.523 | | |
| 12* | −31.902 | 1.145 | 1.5346 | 56.16 |
| 13* | 2.300 | 1.300 | | |
| 14 | Infinity | 0.300 | 1.5670 | 37.80 |
| 15 | Infinity | 0.260 | | |
| Image Plane | Infinity | | | |

Constituent Lens Data

| Lens | Start Surface | Focal Length |
|---|---|---|
| 1 | 1 | 21.700 |
| 2 | 4 | 5.818 |
| 3 | 6 | −7.186 |
| 4 | 8 | −28.179 |
| 5 | 10 | 3.917 |
| 6 | 12 | −3.967 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | −2.812E+00 | 8.606E+00 | 0.000E+00 | −4.136E+00 |
| A4 | −3.733E−03 | 2.693E−03 | 5.451E−03 | 1.323E−02 | −4.971E−03 | −2.875E−03 |
| A6 | 1.132E−04 | −6.532E−04 | −1.799E−03 | −7.707E−03 | −9.176E−04 | 5.801E−03 |

TABLE 1-continued

Numerical Data Example 1

|     |            |            |            |            |            |            |
| --- | ---------- | ---------- | ---------- | ---------- | ---------- | ---------- |
| A8  | 1.480E-05  | 2.544E-04  | 8.832E-05  | 1.901E-03  | -8.682E-04 | -2.407E-03 |
| A10 | 0.000E+00  | 0.000E+00  | 3.312E-05  | -5.900E-05 | 5.769E-04  | 4.991E-04  |
| A12 | 0.000E+00  | 0.000E+00  | 0.000E+00  | 0.000E+00  | -7.352E-05 | -3.913E-05 |
| A14 | 0.000E+00  | 0.000E+00  | 0.000E+00  | 0.000E+00  | 0.000E+00  | 0.000E+00  |
| A16 | 0.000E+00  | 0.000E+00  | 0.000E+00  | 0.000E+00  | 0.000E+00  | 0.000E+00  |

|     | 8th Surface | 9th Surface | 10th Surface | 11th Surface | 12th Surface | 13th Surface |
| --- | ----------- | ----------- | ------------ | ------------ | ------------ | ------------ |
| k   | 0.000E+00   | 0.000E+00   | 0.000E+00    | -3.420E+00   | 0.000E+00    | -6.130E+00   |
| M   | -2.279E-02  | -1.817E-02  | 2.155E-03    | -1.403E-02   | -1.110E-02   | -8.915E-03   |
| A6  | 6.271E-04   | 1.683E-04   | -1.314E-04   | 3.362E-03    | 8.831E-04    | 9.295E-04    |
| A8  | 8.846E-04   | 1.958E-04   | -2.682E-04   | -5.815E-04   | -1.567E-05   | -7.617E-05   |
| A10 | -1.351E-04  | -1.229E-05  | 6.259E-05    | 8.530E-05    | 3.531E-08    | 3.601E-06    |
| A12 | 3.432E-06   | 1.109E-07   | -4.129E-06   | -4.867E-06   | -4.004E-08   | -8.993E-08   |
| A14 | 0.000E+00   | 0.000E+00   | 0.000E+00    | -7.135E-08   | 2.180E-09    | 9.318E-10    |
| A16 | 0.000E+00   | 0.000E+00   | 0.000E+00    | 9.809E-09    | -3.098E-11   | 0.000E+00    |

According to the imaging lens in Example 1, the first lens L1 has positive refractive power, and as shown in Table 17, the imaging lens satisfies all of conditional expressions (1) and (2), and conditional expressions (4) to (14).

Figure 2:
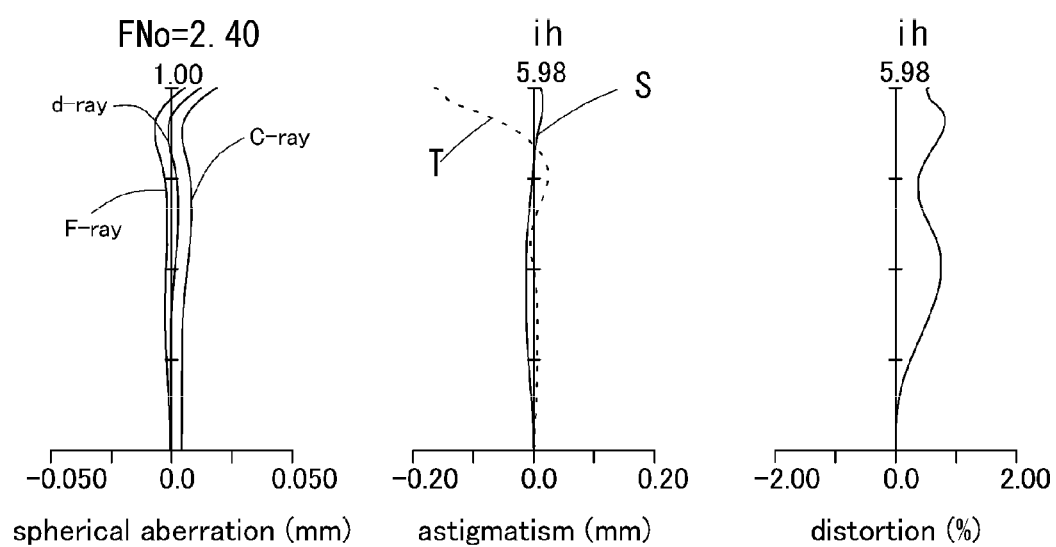
FIG. 2 shows spherical aberration, astigmatism, and distortion of the imaging lens in Example 1.
Figure 3:
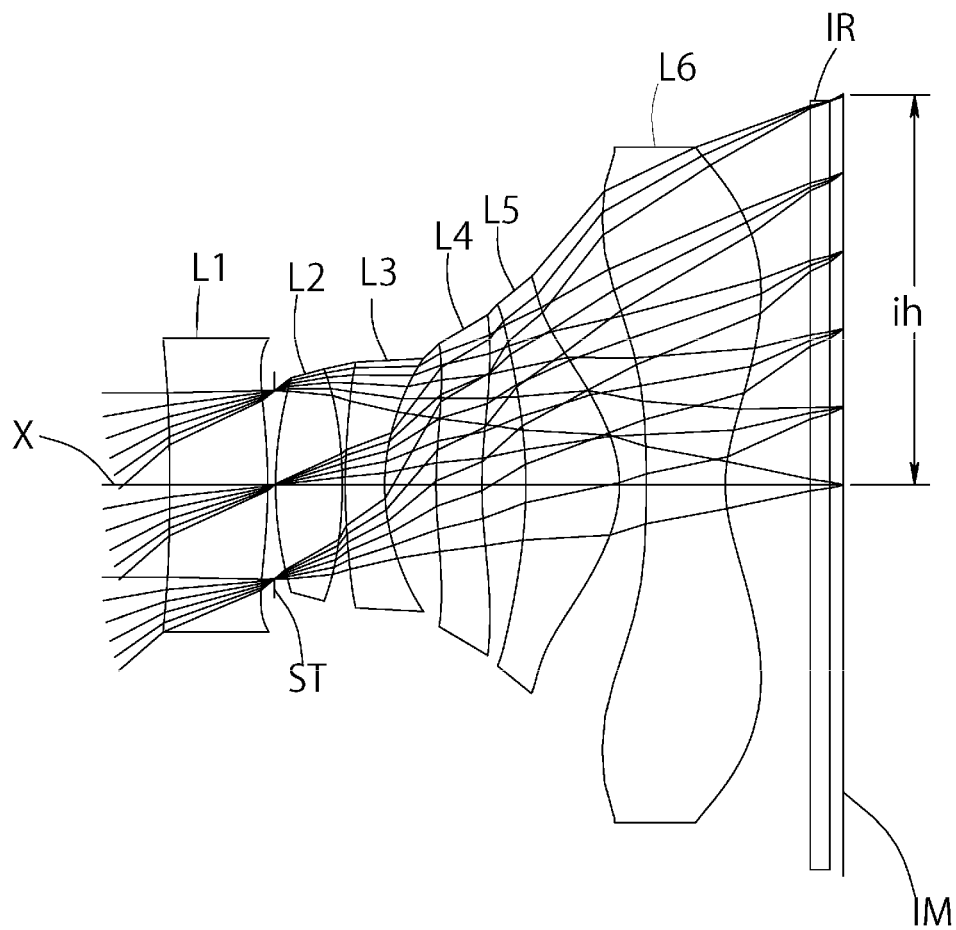
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, 12, 14, 16, 18, 20, 22, 24, 26, 28, 30, and 32). As shown in FIG. 2, each aberration is corrected properly.

Also, an imaging lens system achieving a wide field of view of about 82 degrees and high brightness with an F-value of about 2.4 is provided. Additionally, a ratio of total track length TTL to twice the maximum image height ih (TTL/2ih) is about 0.87, and compactness of the imaging lens is achieved though the imaging lens is composed of six constituent lenses.

EXAMPLE 2

The basic lens data is shown below in Table 2.

TABLE 2

Numerical Data Example 2

Unit mm f = 6.800
Fno = 2.42
ω(°) = 41.2
ih = 5.980

Surface Data

| Surface Number i | Curvature Radius r | Surface Distance d | Refractive Index Nd | Abbe Number vd |
| --- | --- | --- | --- | --- |
| (Object) | Infinity | Infinity | | |
| 1* | -50.126 | 1.500 | 1.5438 | 55.57 |
| 2* | -8.974 | 0.102 | | |
| 3(Stop) | Infinity | 0.020 | | |
| 4* | 5.829 | 1.019 | 1.5438 | 55.57 |
| 5* | -6.607 | 0.047 | | |
| 6* | 11.044 | 0.600 | 1.6142 | 25.58 |
| 7* | 3.000 | 0.789 | | |
| 8* | 7.133 | 0.700 | 1.6142 | 25.58 |
| 9* | 7.385 | 0.673 | | |
| 10* | -7.394 | 1.429 | 1.5346 | 56.16 |
| 11* | -1.915 | 0.411 | | |
| 12* | -33.289 | 1.210 | 1.5346 | 56.16 |
| 13* | 2.300 | 1.300 | | |
| 14 | Infinity | 0.300 | 1.5670 | 37.80 |
| 15 | Infinity | 0.218 | | |
| Image Plane | Infinity | | | |

Constituent Lens Data

| Lens | Start Surface | Focal Length |
| --- | --- | --- |
| 1 | 1 | 19.845 |
| 2 | 4 | 5.864 |
| 3 | 6 | -6.902 |
| 4 | 8 | 165.588 |

TABLE 2-continued

Numerical Data Example 2

| | | | |
|---|---|---|---|
| 5 | | 10 | 4.431 |
| 6 | | 12 | −3.977 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E−F00 | −2.289E+00 | 1.024E+01 | 0.000E+00 | −4.356E+00 |
| A4 | −4.117E−03 | 5.348E−03 | 5.281E−03 | 1.203E−02 | −6.103E−04 | −3.939E−04 |
| A6 | 4.101E−04 | −6.057E−04 | −2.220E−03 | −7.931E−03 | −6.631E−04 | 5.962E−03 |
| A8 | 5.759E−06 | 3.759E−04 | 2.958E−04 | 2.046E−04 | −8.065E−04 | −2.353E−03 |
| A10 | 0.000E+00 | 0.000E+00 | 1.957E−05 | −5.194E−05 | 5.752E−04 | 4.983E−04 |
| A12 | 0.000E+00 | 0.000E+00 | 0.000E+00 | 0.000E+00 | −8.111E−05 | −4.198E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.148E+00 | 0.000E+00 | −6.306E+00 |
| A4 | −1.709E−02 | −9.388E−03 | 2.684E−03 | −1.217E−02 | −1.090E−02 | −9.185E−03 |
| A6 | −2.605E−04 | −9.784E−04 | 7.128E−04 | 2.882E−03 | 8.759E−04 | 9.334E−04 |
| A8 | 5.093E−04 | 2.962E−04 | −3.750E−04 | −5404E−04 | −1.616E−05 | −7.614E−05 |
| A10 | −4.139E−05 | −1.865E−05 | 6.468E−05 | 8132E−05 | 4.341E−08 | 3.576E−06 |
| A12 | −3.951E−06 | −1.280E−07 | −3.906E−06 | −5.142E−06 | −3.986E−08 | −8.935E−08 |
| A14 | 0.000E+00 | 0.000E+00 | 0.000E+00 | −9.543E−08 | 2.190E−09 | 9.327E−10 |
| A16 | 0.000E+00 | 0.000E+00 | 0.000E+00 | 1.215E−08 | −3.127E−11 | 0.000E+00 |

According to the imaging lens in Example 2, the first lens L1 has positive refractive power, and as shown in Table 17, the imaging lens satisfies all of conditional expressions (1) and (2), and conditional expressions (4) to (14).

Figure 4:
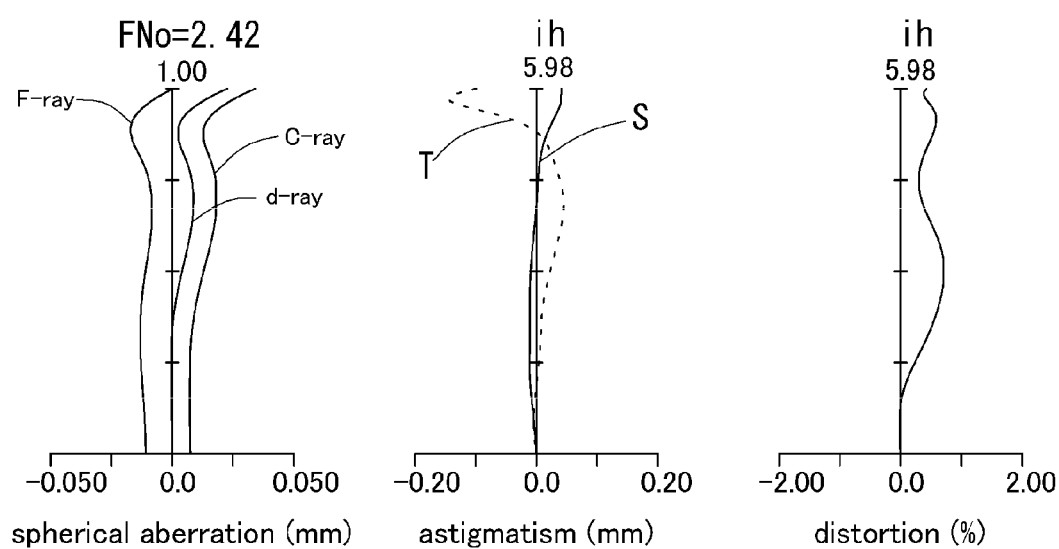
FIG. 4 shows spherical aberration, astigmatism, and distortion of the imaging lens in Example 2.
Figure 5:
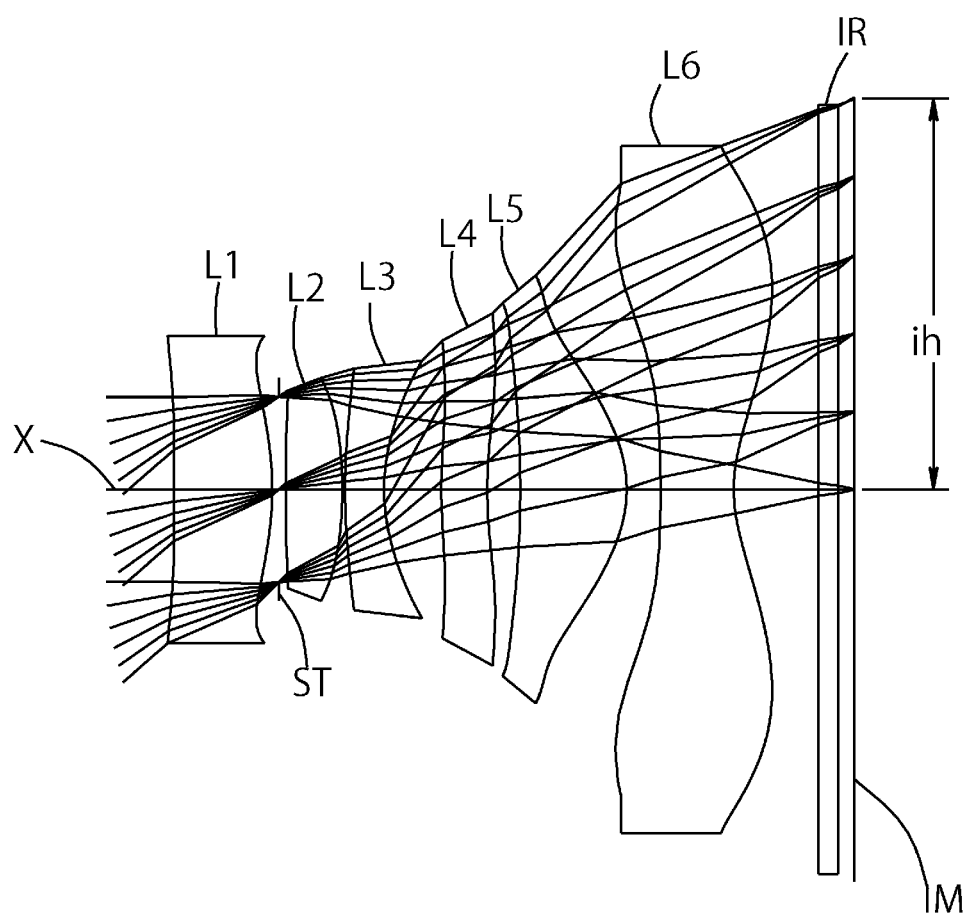
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

Also, an imaging lens system achieving a wide field of view of about 82 degrees and high brightness with an F-value of about 2.4 is provided. Additionally, a ratio of total track length TTL to twice the maximum image height ih (TTL/2ih) is about 0.85, and compactness of the imaging lens is achieved though the imaging lens is composed of six constituent lenses.

EXAMPLES 3

The basic lens data is shown below in Table 3.

TABLE 3

Numerical Data Example 3

Unit mm f = 6.805
Fno = 2.44
ω(°) = 41.2
ih = 5.980

Surface Data

| Surface Number i | Curvature Radius r | Surface Distance d | Refractive Index Nd | Abbe Number νd |
|---|---|---|---|---|
| (Object) | Infinity | Infinity | | |
| 1* | −300.000 | 1.500 | 1.5438 | 55.57 |
| 2* | −4.578 | 0.100 | | |
| 3(Stop) | Infinity | 0.106 | | |
| 4* | 66.236 | 0.866 | 1.5438 | 55.57 |
| 5* | −6.072 | 0.040 | | |
| 6* | 9.530 | 0.600 | 1.6142 | 25.58 |
| 7* | 3.046 | 0.874 | | |
| 8* | 8.116 | 0.700 | 1.6142 | 25.58 |
| 9* | 6.300 | 0.509 | | |
| 10* | −14.450 | 1.624 | 1.5346 | 56.16 |
| 11* | −1.955 | 0.518 | | |
| 12* | −30.320 | 1.120 | 1.5346 | 56.16 |
| 13* | 2.300 | 1.300 | | |
| 14 | Infinity | 0.300 | 1.5670 | 37.80 |
| 15 | Infinity | 0.258 | | |
| Image Plane | Infinity | | | |

TABLE 3-continued

Numerical Data Example 3

Constituent Lens Data

| Lens | Start Surface | Focal Length |
|---|---|---|
| 1 | 1 | 8.533 |
| 2 | 4 | 10.272 |
| 3 | 6 | −7.554 |
| 4 | 8 | −53.713 |
| 5 | 10 | 4.045 |
| 6 | 12 | −3.952 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 9.900E+01 | 8.917E+00 | 0.000E+00 | −2.635E+00 |
| A4 | −5.710E−03 | 1.722E−02 | 1.307E−02 | 5.277E−03 | −1.627E−03 | −4.199E−03 |
| A6 | 3.122E−04 | −3.538E−03 | −5.675E−03 | −6.442E−03 | −1.321E−03 | 5.108E−03 |
| A8 | 3.423E−05 | 6.446E−04 | 8.075E−04 | 1.844E−04 | −8.583E−04 | −2.301E−03 |
| A10 | 0.000E+00 | 0.000E+00 | −9.706E−05 | −1.060E−04 | 6.041E−04 | 5.242E−04 |
| A12 | 0.000E+00 | 0.000E+00 | 0.000E+00 | 0.000E+00 | −8.317E−05 | −4.585E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.259E+00 | 0.000E+00 | −6.036E+00 |
| A4 | −1.962E−02 | −1.477E−02 | 1.872E−03 | −1.350E−02 | −1.114E−02 | −8.849E−03 |
| A6 | 7.366E−05 | −1.939E−04 | 2.391E−04 | 2.921E−03 | 8.816E−04 | 9.264E−04 |
| A8 | 7.340E−04 | 2.086E−04 | −2.796E−04 | −5.382E−04 | −1.528E−05 | −7.625E−05 |
| A10 | −1.023E−04 | −1.163E−05 | 5.937E−05 | 8.817E−05 | 4.032E−08 | 3.597E−06 |
| A12 | 3.112E−06 | −1.405E−07 | −3.910E−06 | −5.129E−06 | −4.031E−08 | −8.904E−08 |
| A14 | 0.000E+00 | 0.000E+00 | 0.000E+00 | −1.003E−07 | 2.154E−09 | 9.130E−10 |
| A16 | 0.000E+00 | 0.000E+00 | 0.000E+00 | 1.194E−08 | −3.030E−11 | 0.000E+00 |

According to the imaging lens in Example 3, the first lens L1 has positive refractive power, and as shown in Table 17, satisfies all of conditional expressions (1) and (2), and conditional expressions (4) to (14).

Figure 6:
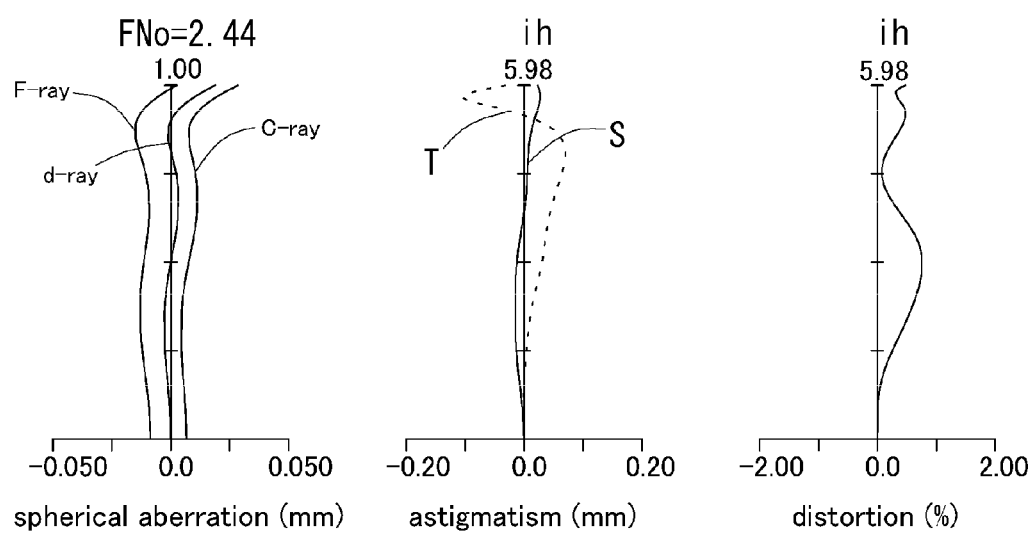
FIG. 6 shows spherical aberration, astigmatism, and distortion of the imaging lens in Example 3.
Figure 7:
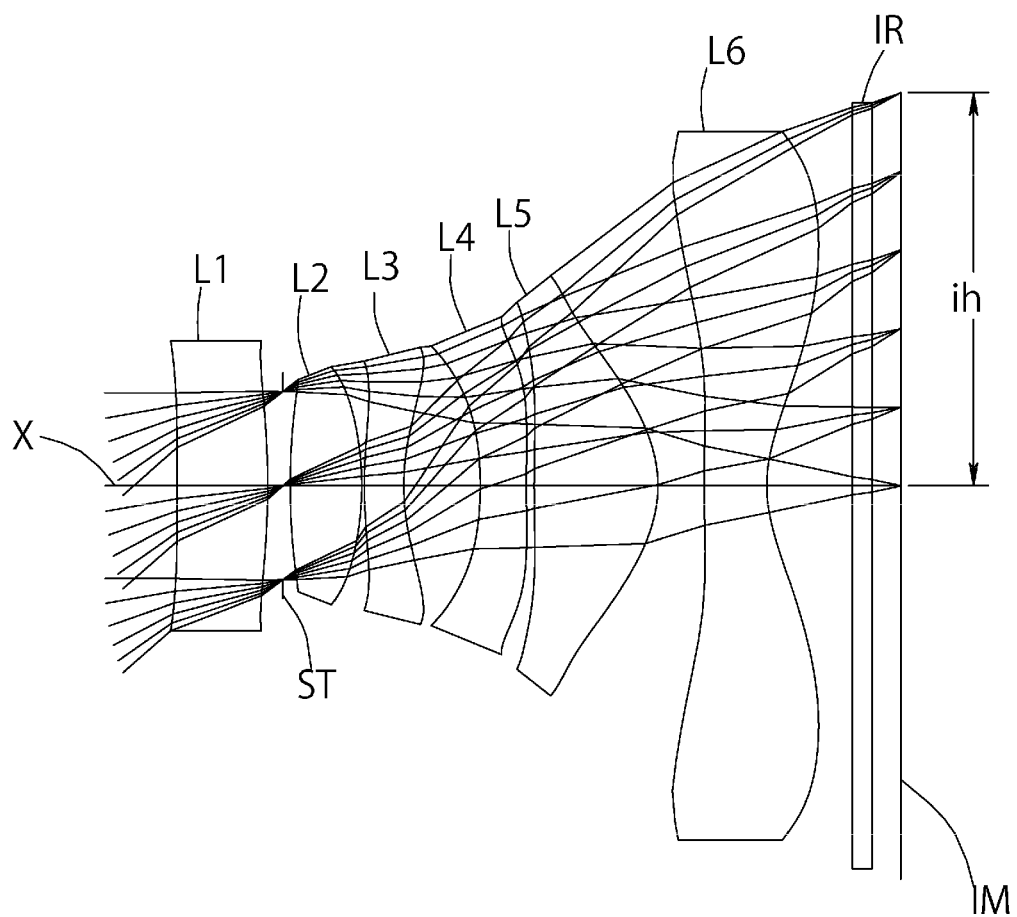
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

Also, an imaging lens system achieving a wide field of view of about 82 degrees and high brightness with an F-value of about 2.4 is provided. Additionally, a ratio of total track length TTL to twice the maximum image height ih (TTL/2ih) is about 0.86, and compactness of the imaging lens is achieved though the imaging lens is composed of six constituent lenses.

EXAMPLE 4

The basic lens data is shown below in Table 4.

TABLE 4

Numerical Data Example 4

Unit mm f = 6.776
Fno = 245
ω(°) = 41.3
ih = 5.980

Surface Data

| Surface Number i | Curvature Radius r | Surface Distance d | Refractive Index Nd | Abbe Number vd |
|---|---|---|---|---|
| (Object) | Infinity | Infinity | | |
| 1* | −280.675 | 1.373 | 1.5438 | 55.57 |
| 2* | −11.717 | 0.231 | | |
| 3(Stop) | Infinity | 0.113 | | |
| 4* | 11.876 | 1.086 | 1.5438 | 55.57 |
| 5* | −4.375 | 0.040 | | |
| 6* | 7.551 | 0.600 | 1.6142 | 25.58 |
| 7* | 3.349 | 1.164 | | |
| 8* | −5.264 | 0.700 | 1.6142 | 25.58 |
| 9* | 25.631 | 0.118 | | |
| 10* | 27.285 | 1.880 | 1.5346 | 56.16 |
| 11* | −1.915 | 0.705 | | |
| 12* | 20.516 | 0.950 | 1.5346 | 56.16 |

TABLE 4-continued

Numerical Data Example 4

| | | | | |
|---|---|---|---|---|
| 13* | 2.097 | 1.300 | | |
| 14 | Infinity | 0.300 | 1.5670 | 37.80 |
| 15 | Infinity | 0.260 | | |
| Image Plane | Infinity | | | |

Constituent Lens Data

| Lens | Start Surface | Focal Length |
|---|---|---|
| 1 | 1 | 22.444 |
| 2 | 4 | 6.021 |
| 3 | 6 | −10.361 |
| 4 | 8 | −7.049 |
| 5 | 10 | 3.424 |
| 6 | 12 | −4.449 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 6.900E−01 | 3.341E+00 | 0.000E+00 | −4.982E+00 |
| A4 | −4.830E−03 | 2.692E−03 | 6.666E−03 | 1.598E−02 | −1.245E−02 | −1.017E−02 |
| A6 | 2.318E−04 | −8.471E−05 | −1.511E−03 | −7.374E−03 | −3.020E−04 | 4.467E−03 |
| A8 | −5.473E−06 | 9.967E−05 | 3.054E−04 | 1.836E−03 | −1.349E−03 | −2.378E−03 |
| A10 | 0.000E+00 | 0.000E+00 | −1.955E−04 | −2.417E−04 | 4.384E−04 | 4.997E−04 |
| A12 | 0.000E+00 | 0.000E+00 | 0.000E+00 | 0.000E+00 | −4.986E−05 | −5.187E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −2.999E+00 | 0.000E+00 | −4.621E+00 |
| A4 | −1.718E−02 | −1.944E−02 | −9.262E−03 | −1.446E−02 | −1.116E−02 | −9.260E−03 |
| A6 | −8.549E−04 | 2.333E−04 | 2.314E−04 | 3.133E−03 | 8.140E−04 | 9.985E−04 |
| A8 | 8.395E−04 | 5.726E−05 | −1.765E−04 | −5.899E−05 | −1.782E−05 | −7.686E−05 |
| A10 | −1.324E−04 | −8.707E−06 | 5.809E−05 | 8.688E−05 | 3.679E−08 | 3.571E−06 |
| A12 | 3.130E−06 | 3.186E−06 | −4.349E−06 | −4.779E−06 | −3.628E−08 | −8.915E−08 |
| A14 | 0.000E+00 | 0.000E+00 | 0.000E+00 | −7.517E−08 | 2.337E−09 | 8.990E−10 |
| A16 | 0.000E+00 | 0.000E+00 | 0.000E+00 | 9.253E−09 | −3.692E−11 | 0.000E+00 |

According to the imaging lens in Example 4, the first lens L1 has positive refractive power, and as shown in Table 17, the imaging lens satisfies all of conditional expressions (1) and (2), and conditional expressions (4) to (14).

Figure 8:
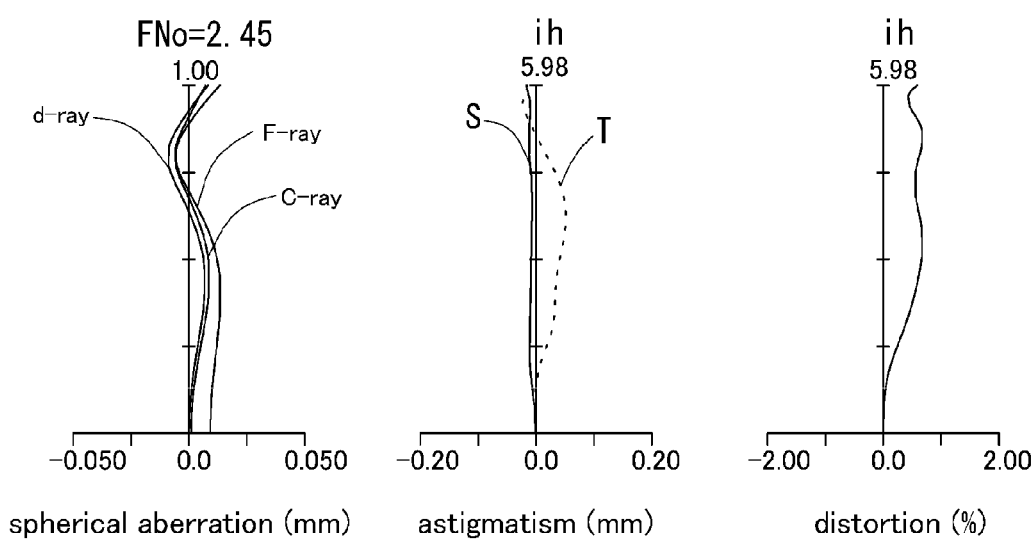
FIG. 8 shows spherical aberration, astigmatism, and distortion of the imaging lens in Example 4.
Figure 9:
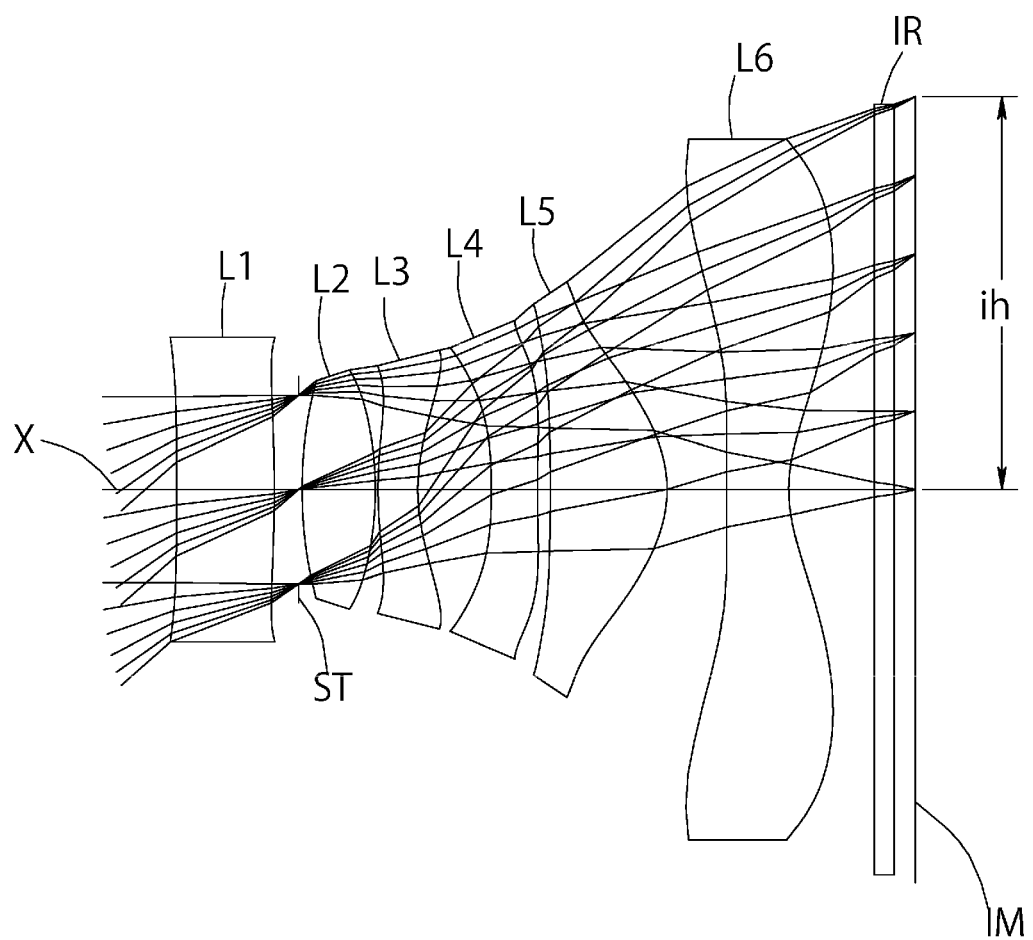
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

Also, an imaging lens system achieving a wide field of view of about 82 degrees and high brightness with an F-value of about 2.5 is provided. Additionally, a ratio of total track length TTL to twice the maximum image height ih (TTL/2ih) is about 0.91, and compactness of the imaging lens is achieved though the imaging lens is composed of six constituent lenses.

EXAMPLE 5

The basic lens data is shown below in Table 5.

TABLE 5

Numerical Data Example 5

Unit mm $f = 6.781$
$Fno = 2.46$
$\omega(°) = 41.3$
$ih = 5.980$

Surface Data

| Surface Number i | Curvature Radius r | Surface Distance d | Refractive Index Nd | Abbe Number vd |
|---|---|---|---|---|
| (Object) | Infinity | Infinity | | |
| 1* | −248.941 | 1.481 | 1.5438 | 55.57 |
| 2* | −23.657 | 0.370 | | |
| 3(Stop) | Infinity | 0.055 | | |
| 4* | 7.471 | 1.113 | 1.5438 | 55.57 |
| 5* | −4.713 | 0.040 | | |
| 6* | 6.329 | 0.606 | 1.6142 | 25.58 |
| 7* | 3.000 | 1.120 | | |

TABLE 5-continued

Numerical Data Example 5

| | | | | |
|---|---|---|---|---|
| 8* | −8.108 | 0.700 | 1.6142 | 25.58 |
| 9* | 17.701 | 0.195 | | |
| 10* | −35.000 | 1.772 | 1.5346 | 56.16 |
| 11* | −1.915 | 0.902 | | |
| 12* | 32.003 | 0.950 | 1.5346 | 56.16 |
| 13* | 2.300 | 1.300 | | |
| 14 | Infinity | 0.300 | 1.5670 | 37.80 |
| 15 | Infinity | 0.335 | | |
| Image Plane | Infinity | | | |

Constituent Lens Data

| Lens | Start Surface | Focal Length |
|---|---|---|
| 1 | 1 | 47.958 |
| 2 | 4 | 5.491 |
| 3 | 6 | −9.977 |
| 4 | 8 | −8.961 |
| 5 | 10 | 3.720 |
| 6 | 12 | −4.687 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 1.011E+00 | 3.907E+00 | 0.000E+00 | −4.980E+00 |
| A4 | −3.392E−03 | 1.717E−03 | 7.227E−03 | 1.836E−02 | −1.569E−02 | −9.296E−03 |
| A6 | 3.309E−05 | −4.359E−04 | −1.705E−03 | −7.840E−03 | −5.368E−04 | 4.460E−03 |
| A8 | 7.116E−06 | 1.704E−04 | 4.264E−04 | 1.822E−03 | −1.383E−03 | −2.350E−03 |
| A10 | 0.000E+00 | 0.000E+00 | −1.233E−04 | −1.749E−04 | 4.016E−04 | 4.838E−04 |
| A12 | 0.000E+00 | 0.000E+00 | 0.000E+00 | 0.000E+00 | −3.957E−05 | −4.444E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −2.930E+00 | 0.000E+00 | −5.110E+00 |
| A4 | −2.432E−02 | −1.763E−02 | 9.310E−04 | −1.661E−02 | −1.048E−02 | −9.167E−03 |
| A6 | −9.833E−05 | 2.120E−04 | −7.926E−04 | 3.287E−03 | 7.338E−04 | 9.661E−04 |
| A8 | 1.089E−03 | 9.477E−06 | −1.930E−04 | −5.536E−04 | −1.602E−05 | −7.557E−05 |
| A10 | −1.292E−04 | −1.300E−05 | 6.489E−05 | 8.704E−05 | 1.182E−07 | 3.561E−06 |
| A12 | −1.395E−06 | 3.858E−06 | −4.362E−06 | −5.056E−06 | −3.665E−08 | −9.042E−08 |
| A14 | 0.000E+00 | 0.000E+00 | 0.000E+00 | −8.900E−08 | 2.222E−09 | 9.343E−10 |
| A16 | 0.000E+00 | 0.000E+00 | 0.000E+00 | 1.121E−08 | −3.549E−11 | 0.000E+00 |

According to the imaging lens in Example 5, the first lens L1 has positive refractive power, and as shown in Table 17, the imaging lens satisfies all of conditional expressions (1) and (2), and conditional expressions (4) to (14).

Figure 10:
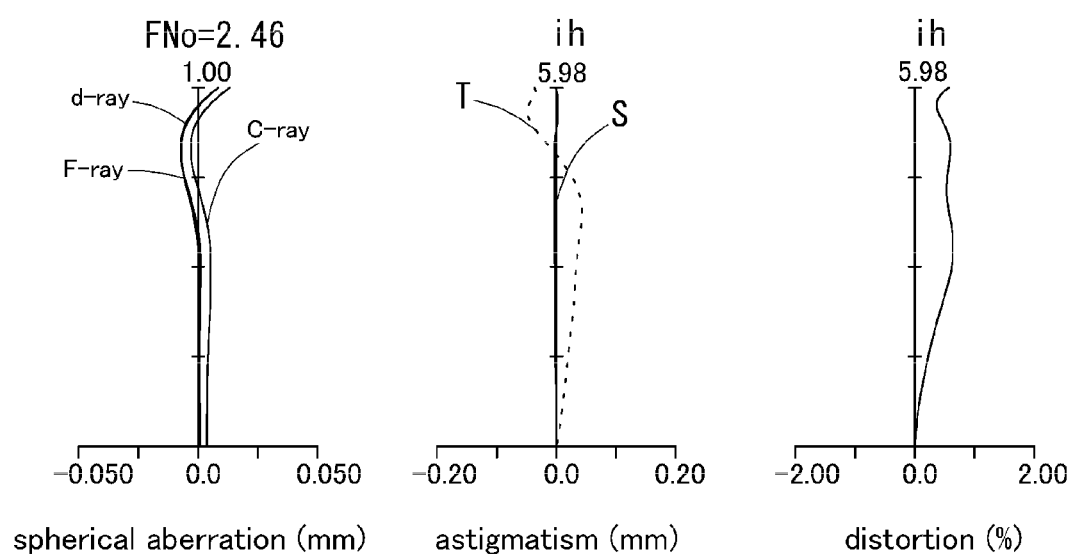
FIG. 10 shows spherical aberration, astigmatism, and distortion of the imaging lens in Example 5.
Figure 11:
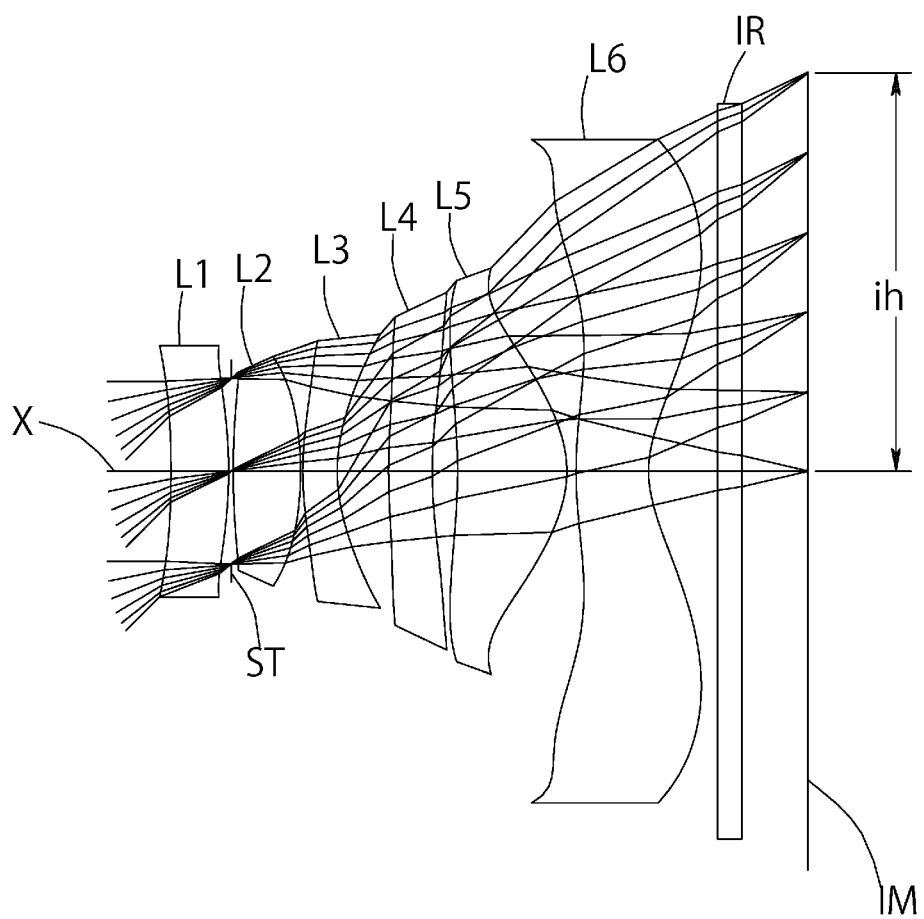
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

Also, an imaging lens system achieving a wide field of view of about 82 degrees and high brightness with an F-value of about 2.5 is provided. Additionally, a ratio of total track length TTL to twice the maximum image height ih (TTL/2ih) is about 0.93, and compactness of the imaging lens is achieved though the imaging lens is composed of six constituent lenses.

EXAMPLE 6

The basic lens data is shown below in Table 6.

TABLE 6

Numerical Data Example 6

Unit mm f = 3.449
Fno = 2.24
ω(°) = 45.0
ih = 3.470

Surface Data

| Surface Number i | Curvature Radius r | Surface Distance d | Refractive Index Nd | Abbe Number νd |
|---|---|---|---|---|
| (Object) | Infinity | Infinity | | |
| 1* | −9.080 | 0.500 | 1.5438 | 55.57 |
| 2* | −3.940 | 0.023 | | |

TABLE 6-continued

Numerical Data Example 6

| | | | | |
|---|---|---|---|---|
| 3(Stop) | Infinity | 0.017 | | |
| 4* | 7.354 | 0.585 | 1.5438 | 55.57 |
| 5* | −2.843 | 0.020 | | |
| 6* | 2.974 | 0.300 | 1.6349 | 23.97 |
| 7* | 1.507 | 0.445 | | |
| 8* | 5.286 | 0.380 | 1.6349 | 23.97 |
| 9* | 3.746 | 0.219 | | |
| 10* | −4.707 | 0.950 | 1.5346 | 56.16 |
| 11* | −0.984 | 0.080 | | |
| 12* | 3.623 | 0.630 | 1.5346 | 56.16 |
| 13* | 0.950 | 0.600 | | |
| 14 | Infinity | 0.210 | 1.5168 | 64.20 |
| 15 | Infinity | 0.576 | | |
| Image Plane | Infinity | | | |

Constituent Lens Data

| Lens | Start Surface | Focal Length |
|---|---|---|
| 1 | 1 | 12.372 |
| 2 | 4 | 3.848 |
| 3 | 6 | −5.224 |
| 4 | 8 | −22.412 |
| 5 | 10 | 2.138 |
| 6 | 12 | −2.624 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 0.000E+00 | 5.005E+00 | 0.000E+00 | −3.256E+00 |
| A4 | −4.258E−02 | 3.477E−02 | 3.822E−02 | 2.885E−02 | −8.017E−02 | −3.089E−02 |
| A6 | 1.988E−02 | −2.175E−02 | −8.346E−02 | −1.003E−01 | −2.370E−03 | 6.957E−02 |
| A8 | −2.546E−03 | 2.808E−02 | 4.646E−02 | 8.788E−02 | −2.737E−02 | −9.219E−02 |
| A10 | 0.000E+00 | 0.000E+00 | −2.466E−02 | −1.990E−02 | 6.448E−02 | 6.386E−02 |
| A12 | 0.000E+00 | 0.000E+00 | 0.000E+00 | 0.000E+00 | −2.433E−02 | −1.598E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.537E+00 | 0.000E+00 | −4.723E+00 |
| A4 | −9.818E−02 | −7.148E−02 | 5.431E−02 | −8.332E−02 | −8.400E−02 | −4.341E−02 |
| A6 | 1.844E−02 | 1.222E−02 | 4.661E−04 | 5.415E−02 | 1.216E−02 | 1.115E−02 |
| A8 | 4.098E−02 | 3.628E−03 | −1.361E−02 | −2.359E−02 | −6.086E−04 | −2.597E−03 |
| A10 | −2.547E−02 | −1.242E−03 | 6.836E−03 | 1.027E−02 | 3.063E−05 | 3.929E−04 |
| A12 | 4.259E−03 | 2.470E−05 | −9.821E−04 | −1.633E−03 | −1.139E−05 | −3.280E−05 |
| A14 | 0.000E+00 | 0.000E+00 | 0.000E+00 | −8.706E−05 | 1.948E−06 | 1.112E−06 |
| A16 | 0.000E+00 | 0.000E+00 | 0.000E+00 | 2.771E−05 | −1.263E−07 | 0.000E+00 |

According to the imaging lens in Example 6, the first lens L1 has positive refractive power, and as shown in Table 17, the imaging lens satisfies all of conditional expressions (1) and (2), and conditional expressions (4) to (14).

Figure 12:
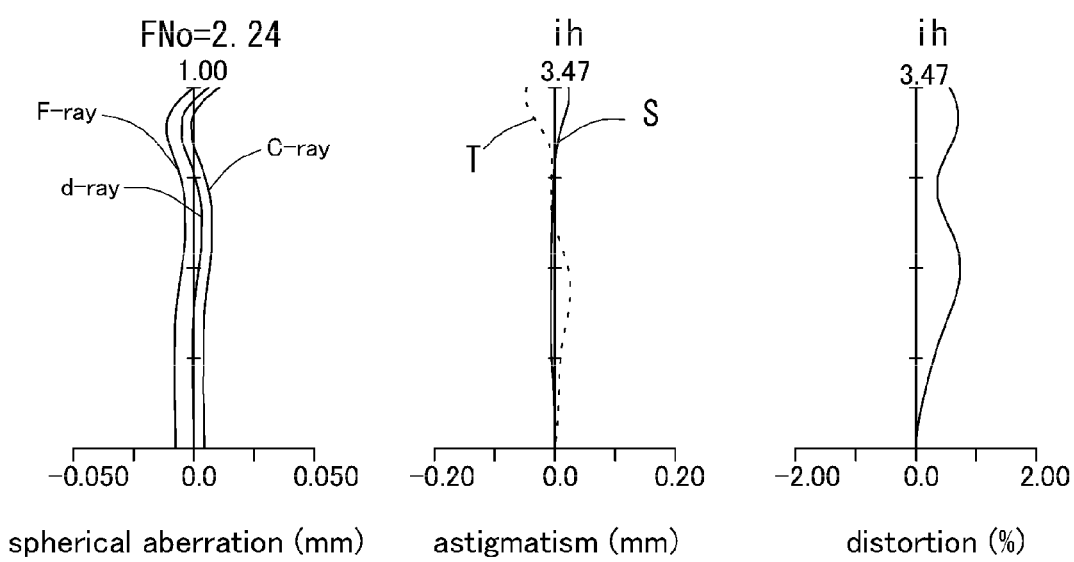
FIG. 12 shows spherical aberration, astigmatism, and distortion of the imaging lens in Example 6.
Figure 13:
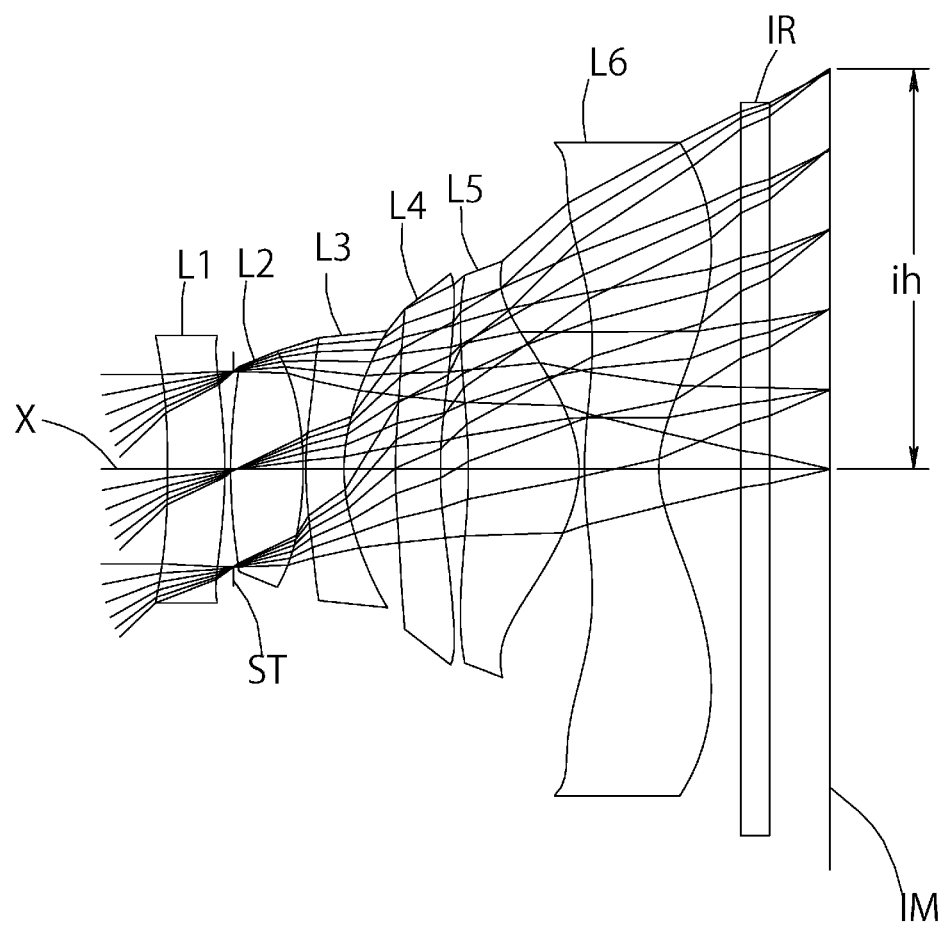
FIG. 13 is a schematic view showing the general configuration of an imaging lens in Example 7.

FIG. 12 shows spherical aberration (mm), astigmatism (mm), and distortion (%) of the imaging lens in Example 6. Even when the imaging lens is applied to a compact imaging sensor as Example 6, as shown in FIG. 12, each aberration is corrected properly.

Also, an imaging lens system achieving a wide field of view of about 90 degrees and high brightness with an F-value of about 2.2 is provided. Additionally, a ratio of total track length TTL to twice the maximum image height ih (TTL/2ih) is about 0.79, and compactness of the imaging lens is achieved though the imaging lens is composed of six constituent lenses.

EXAMPLE 7

The basic lens data is shown below in Table 7.

TABLE 7

Numerical Data Example 7

Unit mm f = 3.057
Fno = 2.21
ω(°) = 43.7
ih = 2.934

TABLE 7-continued

Numerical Data Example 7

Surface Data

| Surface Number i | Curvature Radius r | Surface Distance d | Refractive Index Nd | Abbe Number vd |
|---|---|---|---|---|
| (Object) | Infinity | Infinity | | |
| 1* | −7.778 | 0.419 | 1.5438 | 55.57 |
| 2* | −3.966 | 0.063 | | |
| 3(Stop) | Infinity | −0.021 | | |
| 4* | 4.660 | 0.530 | 1.5438 | 55.57 |
| 5* | −2.607 | 0.020 | | |
| 6* | 2.678 | 0.280 | 1.6349 | 23.97 |
| 7* | 1.305 | 0.376 | | |
| 8* | 3.858 | 0.330 | 1.6349 | 23.97 |
| 9* | 2.969 | 0.204 | | |
| 10* | −3.950 | 0.810 | 1.5346 | 56.16 |
| 11* | −0.829 | 0.040 | | |
| 12* | 3.170 | 0.544 | 1.5346 | 56.16 |
| 13* | 0.800 | 0.600 | | |
| 14 | Infinity | 0.210 | 1.5168 | 64.20 |
| 15 | Infinity | 0.442 | | |
| Image Plane | Infinity | | | |

Constituent Lens Data

| Lens | Start Surface | Focal Length |
|---|---|---|
| 1 | 1 | 14.326 |
| 2 | 4 | 3.155 |
| 3 | 6 | −4.354 |
| 4 | 8 | −23.711 |
| 5 | 10 | 1.799 |
| 6 | 12 | −2.176 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 0.000E+00 | 5.347E+00 | 0.000E+00 | −3.200E+00 |
| A4 | −6.049E−02 | 5.188E−02 | 7.330E−02 | 4.688E−02 | −1.270E−01 | −4.689E−02 |
| A6 | 4.012E−02 | −5.692E−02 | −1.868E−01 | −2.166E−01 | −1.469E−02 | 1.525E−01 |
| A8 | −7.967E−03 | 8.272E−02 | 1.472E−01 | 2.501E−01 | −8.568E−02 | −2.825E−01 |
| A10 | 0.000E+00 | 0.000E+00 | −8.557E−02 | −7.620E−02 | 2.791E−01 | 2.719E−01 |
| A12 | 0.000E+00 | 0.000E+00 | 0.000E+00 | 0.000E+00 | −1.411E−01 | −9.551E−02 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.588E+00 | 0.000E+00 | −4.866E+00 |
| A4 | −1.515E−01 | −1.171E−01 | 8.962E−02 | −1.249E−01 | −1.304E−01 | −7.240E−02 |
| A6 | 3.233E−02 | 2.544E−02 | 7.062E−04 | 1.184E−01 | 2.693E−02 | 2.626E−02 |
| A8 | 1.235E−01 | 1.067E−02 | −4.232E−02 | −7.326E−02 | −1.936E−03 | −8.132E−03 |
| A10 | −1.066E−01 | −5.353E−03 | 2.859E−02 | 4.326E−02 | 1.247E−04 | 1.645E−03 |
| A12 | 2.510E−02 | −2.398E−02 | −5.762E−03 | −9.553E−03 | −6.613E−05 | −1.892E−04 |
| A14 | 0.000E+00 | 0.000E+00 | 0.000E+00 | −7.067E−04 | 1.617E−05 | 9.210E−06 |
| A16 | 0.000E+00 | 0.000E+00 | 0.000E+00 | 3.237E−04 | −1.479E−06 | 0.000E+00 |

According to the imaging lens in Example 7, the first lens L1 has positive refractive power, and as shown in Table 17, the imaging lens satisfies all of conditional expressions (1) and (2), and conditional expressions (4) to (14).

Figure 14:
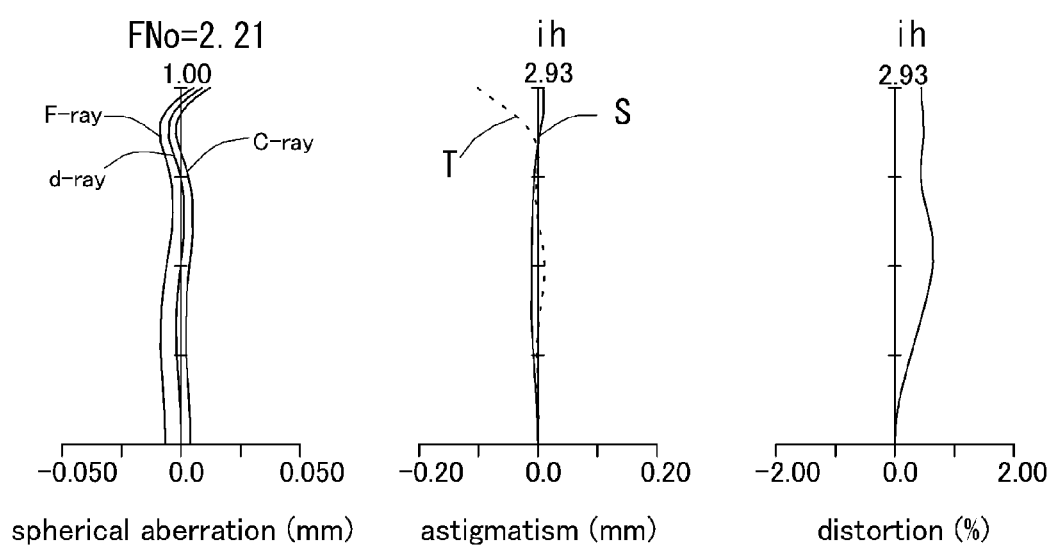
FIG. 14 shows spherical aberration, astigmatism, and distortion of the imaging lens in Example 7.
Figure 15:
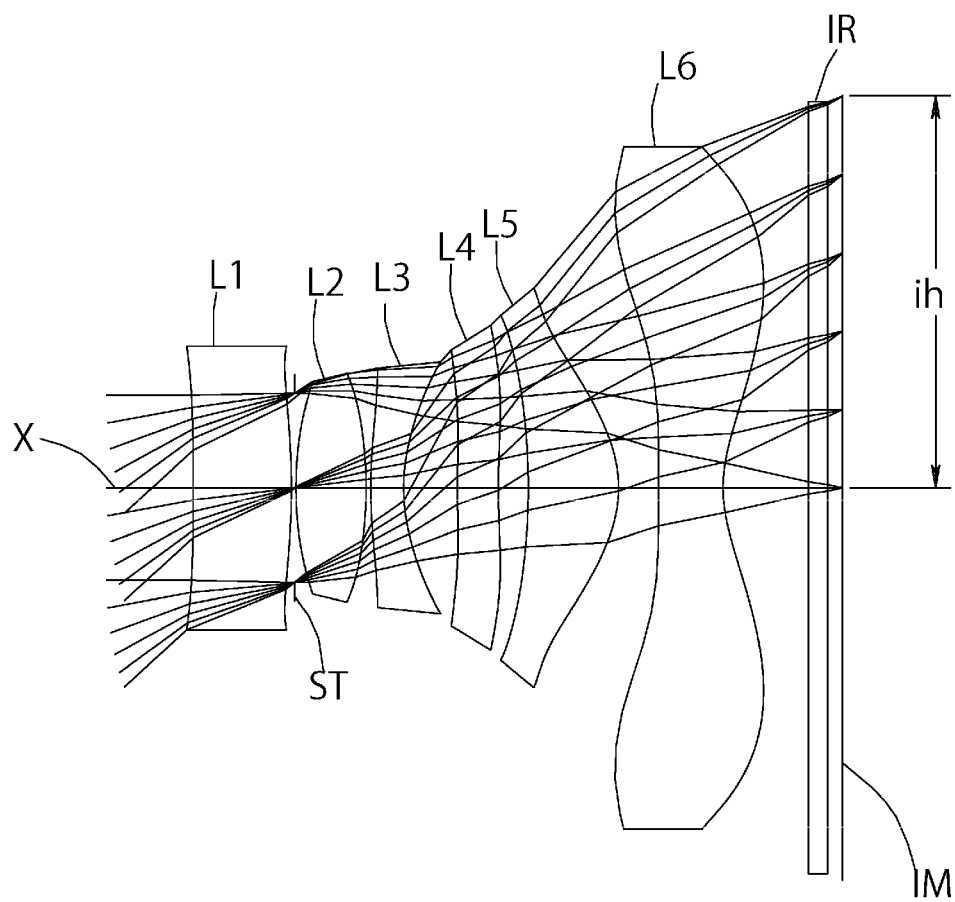
FIG. 15 is a schematic view showing the general configuration of an imaging lens in Example 8.

FIG. 14 shows spherical aberration (mm), astigmatism (mm), and distortion (%) of the imaging lens in Example 7. Even when the imaging lens is applied to a contact imaging sensor as Example 7, as shown in FIG. 14, each aberration is corrected properly.

Also, an imaging lens system achieving a wide field of view of about 87 degrees and high brightness with an F-value of about 2.2 is provided. Additionally, a ratio of total track length TTL to twice the maximum image height ih (TTL/2ih) is about 0.81, and compactness of the imaging lens is achieved though the imaging lens is composed of six constituent lenses.

EXAMPLE 8

The basic lens data is shown below in Table 8.

Figure 16:
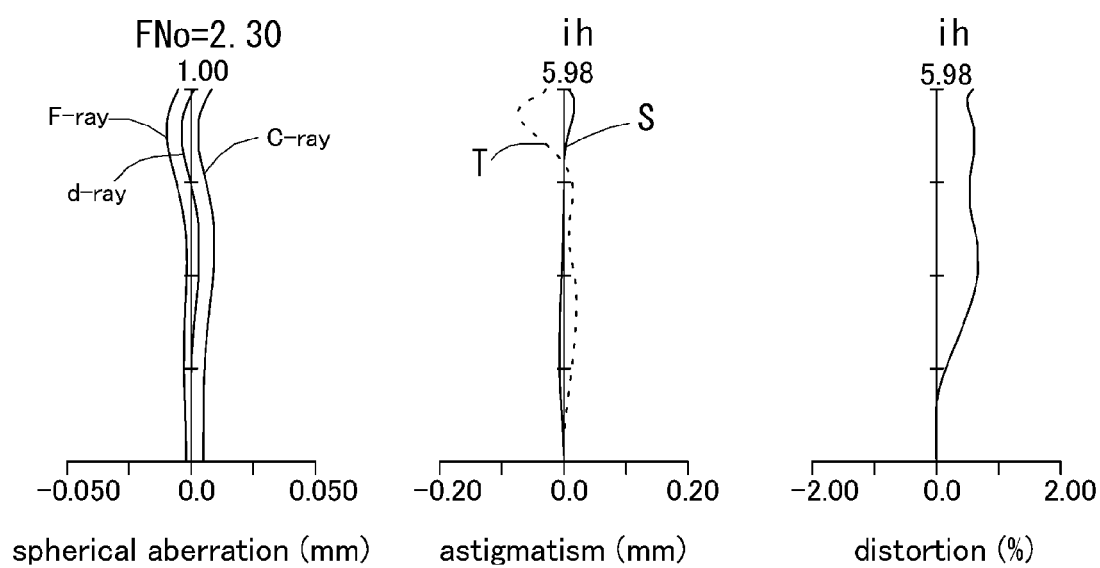
FIG. 16 shows spherical aberration, astigmatism, and distortion of the imaging lens in Example 8.
Figure 17:
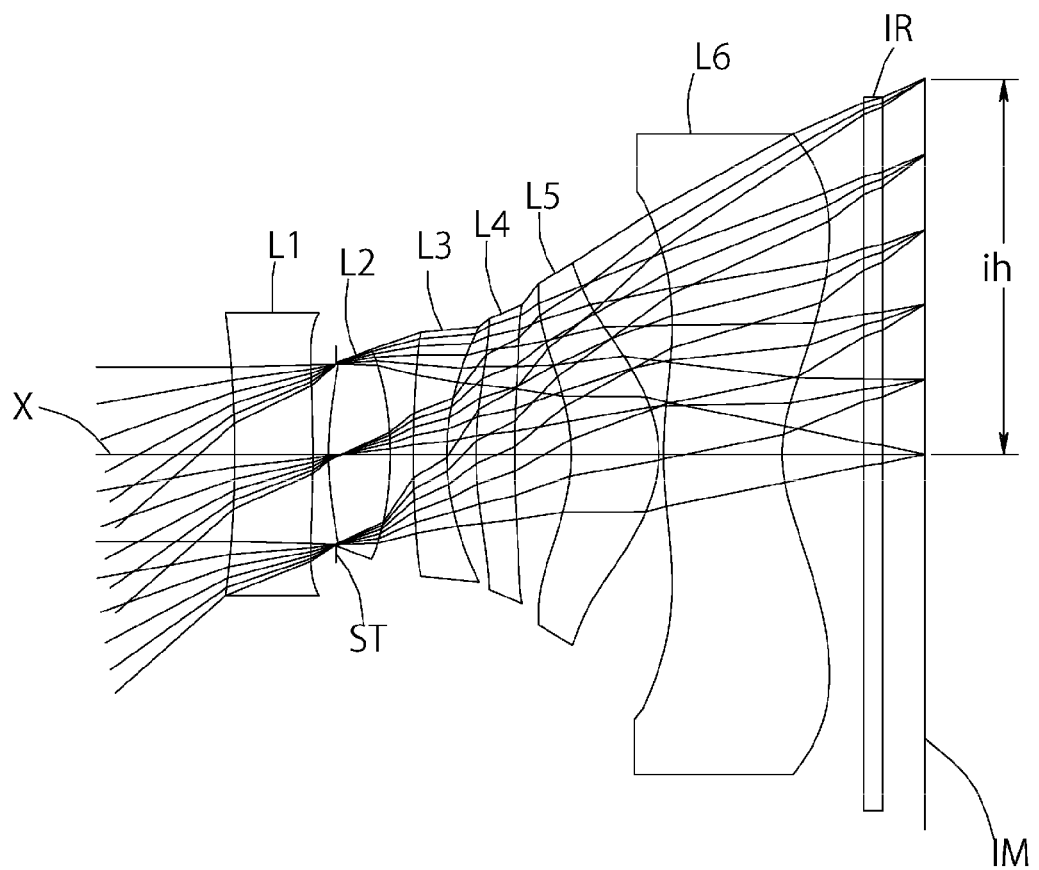
FIG. 17 is a schematic view showing the general configuration of an imaging lens in Example 9.

FIG. 16 shows spherical aberration (mm), astigmatism (mm), and distortion (%) of the imaging lens in Example 8. As shown in FIG. 16, each aberration is corrected properly.

TABLE 8

Numerical Data Example 8

Unit mm $f = 6.492$
$Fno = 2.30$
$\omega(°) = 42.5$
$ih = 5.980$

Surface Data

| Surface Number i | Curvature Radius r | Surface Distance d | Refractive Index Nd | Abbe Number vd |
|---|---|---|---|---|
| (Object) | Infinity | Infinity | | |
| 1* | −121.481 | 1.498 | 1.5438 | 55.57 |
| 2* | −10.738 | 0.050 | | |
| 3(Stop) | Infinity | 0.020 | | |
| 4* | 5.787 | 1.069 | 1.5438 | 55.57 |
| 5* | −6.075 | 0.071 | | |
| 6* | 7.376 | 0.500 | 1.6349 | 23.97 |
| 7* | 2.795 | 0.822 | | |
| 8* | 23.065 | 0.624 | 1.6349 | 23.97 |
| 9* | 12.062 | 0.457 | | |
| 10* | −9.734 | 1.374 | 1.5346 | 56.16 |
| 11* | −1.915 | 0.614 | | |
| 12* | 656.055 | 0.980 | 1.5346 | 56.16 |
| 13* | 2.145 | 1.000 | | |
| 14 | Infinity | 0.300 | 1.5168 | 64.20 |
| 15 | Infinity | 0.525 | | |
| Image Plane | Infinity | | | |

Constituent Lens Data

| Lens | Start Surface | Focal Length |
|---|---|---|
| 1 | 1 | 21.557 |
| 2 | 4 | 5.629 |
| 3 | 6 | −7.403 |
| 4 | 8 | −40.721 |
| 5 | 10 | 4.202 |
| 6 | 12 | −4.027 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | −4.119E−01 | 7.182E+00 | 0.000E+00 | −3.898E+00 |
| A4 | −5.512E−03 | 3.944E−03 | 6.709E−03 | 1.294E−02 | −9.917E−03 | −3.701E−03 |
| A6 | 4.993E−04 | −1.770E−04 | −1.463E−03 | −7.818E−03 | −3.025E−04 | 5.578E−03 |
| A8 | −1.992E−05 | 1.572E−04 | 2.364E−04 | 2.106E−03 | −1.057E−03 | −2.371E−03 |
| A10 | 0.000E+00 | 0.000E+00 | −8.650E−05 | −2.137E−04 | 5.066E−04 | 5.268E−04 |
| A12 | 0.000E+00 | 0.000E+00 | 0.000E+00 | 0.000E+00 | −5.669E−05 | −4.496E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.306E+00 | 0.000E+00 | −5.672E+00 |
| A4 | −1.940E−02 | −1.611E−02 | 1.342E−03 | −1.329E−02 | −1.186E−02 | −9.221E−03 |
| A6 | 8.988E−04 | 1.714E−04 | −1.961E−04 | 3.189E−03 | 8.617E−04 | 9.387E−04 |
| A8 | 8.515E−04 | 2.262E−04 | −2.509E−04 | −5.550E−04 | −1.559E−05 | −7.460E−05 |
| A10 | −1.447E−04 | −9.236E−06 | 6.816E−05 | 8.673E−05 | 6.579E−08 | 3.530E−06 |
| A12 | 4.245E−06 | −1.041E−06 | −5.172E−06 | −5.194E−06 | −3.940E−08 | −9.134E−08 |
| A14 | 0.000E+00 | 0.000E+00 | 0.000E+00 | −1.005E−07 | 2.195E−09 | 9.866E−10 |
| A16 | 0.000E+00 | 0.000E+00 | 0.000E+00 | 1.288E−08 | −3.268E−11 | 0.000E+00 |

According to the imaging lens in Example 8, the first lens L1 has positive refractive power, and as shown in Table 17, the imaging lens satisfies all of conditional expressions (1) and (2), and conditional expressions (4) to (14).

Also, an imaging lens system achieving a wide field of view of about 85 degrees and high brightness with an F-value of about 2.3 is provided. Additionally, a ratio of total track length TTL to twice the maximum image height ih (TTL/2ih) is about 0.82, and compactness of the imaging lens is achieved though the imaging lens is composed of six constituent lenses.

EXAMPLE 9

The basic lens data is shown below in Table 9.

TABLE 9

Numerical Data Example 9

Unit mm f = 6.685
Fno = 2.40
ω(°) = 41.5
ih = 5.980

Surface Data

| Surface Number i | Curvature Radius r | Surface Distance d | Refractive Index Nd | Abbe Number vd |
|---|---|---|---|---|
| (Object) | Infinity | Infinity | | |
| 1* | −19.540 | 1.250 | 1.5438 | 55.57 |
| 2* | −21.941 | 0.371 | | |
| 3(Stop) | Infinity | −0.120 | | |
| 4* | 5.856 | 0.978 | 1.5438 | 55.57 |
| 5* | −5.854 | 0.372 | | |
| 6* | 15.430 | 0.530 | 1.6349 | 23.97 |
| 7* | 3.500 | 0.471 | | |
| 8* | 5.573 | 0.610 | 1.5346 | 56.16 |
| 9* | 15.367 | 0.903 | | |
| 10* | −3.175 | 1.397 | 1.5346 | 56.16 |
| 11* | −2.001 | 0.080 | | |
| 12* | 6.898 | 1.889 | 1.5346 | 56.16 |
| 13* | 2.300 | 1.300 | | |
| 14 | Infinity | 0.300 | 1.5670 | 37.80 |
| 15 | Infinity | 0.672 | | |
| Image Plane | Infinity | | | |

Constituent Lens Data

| Lens | Start Surface | Focal Length |
|---|---|---|
| 1 | 1 | −402.121 |
| 2 | 4 | 5.546 |
| 3 | 6 | −7.255 |
| 4 | 8 | 16.009 |
| 5 | 10 | 7.155 |
| 6 | 12 | −7.532 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E−F00 | 0.000E+00 | 0.000E+00 | 0.000E+00 | 0.000E+00 |
| A4 | −5.974E−04 | 5.114E−03 | 1.290E−05 | −1.257E−05 | −4.890E−03 | −1.782E−02 |
| A6 | 1.203E−05 | −1.456E−03 | −3.931E−03 | −3.741E−03 | 1.004E−03 | 5.336E−03 |
| A8 | 6.170E−06 | 4.042E−04 | 7.606E−04 | 6.957E−04 | −2.249E−05 | −1.158E−03 |
| A10 | 0.000E+00 | 0.000E+00 | −1.127E−04 | −7.286E−05 | 2.790E−05 | 9.874E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −2.238E+00 | 0.000E+00 | −5.091E+00 |
| A4 | −1.191E−02 | −1.199E−03 | 1.403E−02 | −7.112E−03 | −1.358E−02 | −6.343E−03 |
| A6 | −1.045E−04 | −1.103E−03 | 1.664E−04 | 7.637E−04 | 9.039E−04 | 4.707E−04 |
| A8 | 1.854E−04 | 1.201E−04 | 1.351E−04 | 8.531E−05 | −1.517E−05 | −2.652E−05 |
| A10 | −2.064E−05 | 9.121E−06 | −1.018E−05 | 1.001E−06 | −4.125E−06 | 8.360E−07 |
| A12 | 0.000E+00 | 0.000E+00 | 0.000E+00 | −8.131E−07 | 2.944E−07 | −1.546E−08 |
| A14 | 0.000E+00 | 0.000E+00 | 0.000E+00 | 0.000E+00 | −2.973E−09 | 1.423E−10 |
| A16 | 0.000E+00 | 0.000E+00 | 0.000E+00 | 0.000E+00 | −1.458E−10 | 0.000E+00 |

According to the imaging lens in Example 8, the first lens L1 has negative refractive power, and as shown in Table 17, the imaging lens satisfies all of conditional expressions (1) and (3), conditional expressions (4) to (8), conditional expression (9-1), conditional expression (10-1), conditional expression (11-1), and conditional expressions (12) to (14).

Figure 18:
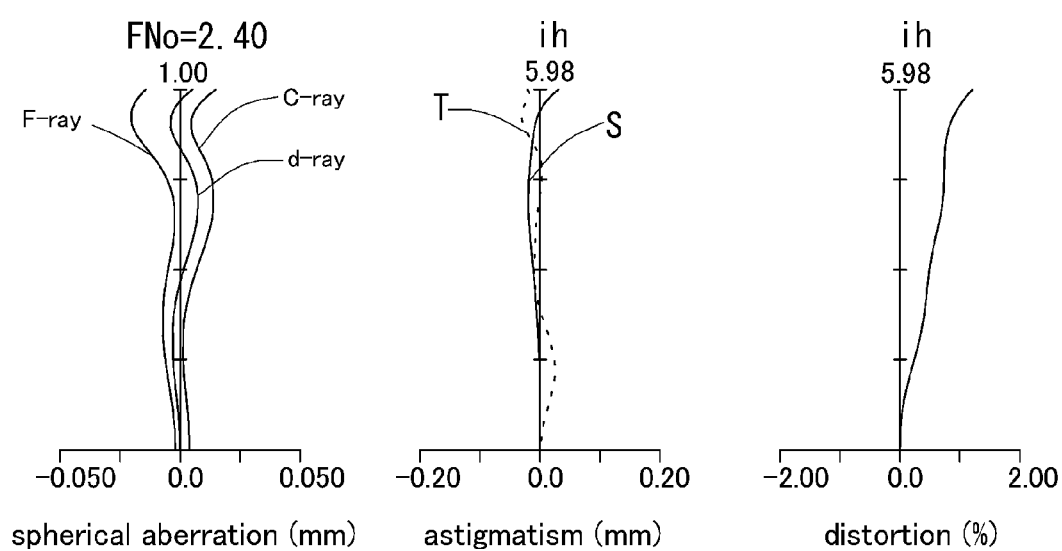
FIG. 18 shows spherical aberration, astigmatism, and distortion of the imaging lens in Example 9.
Figure 19:
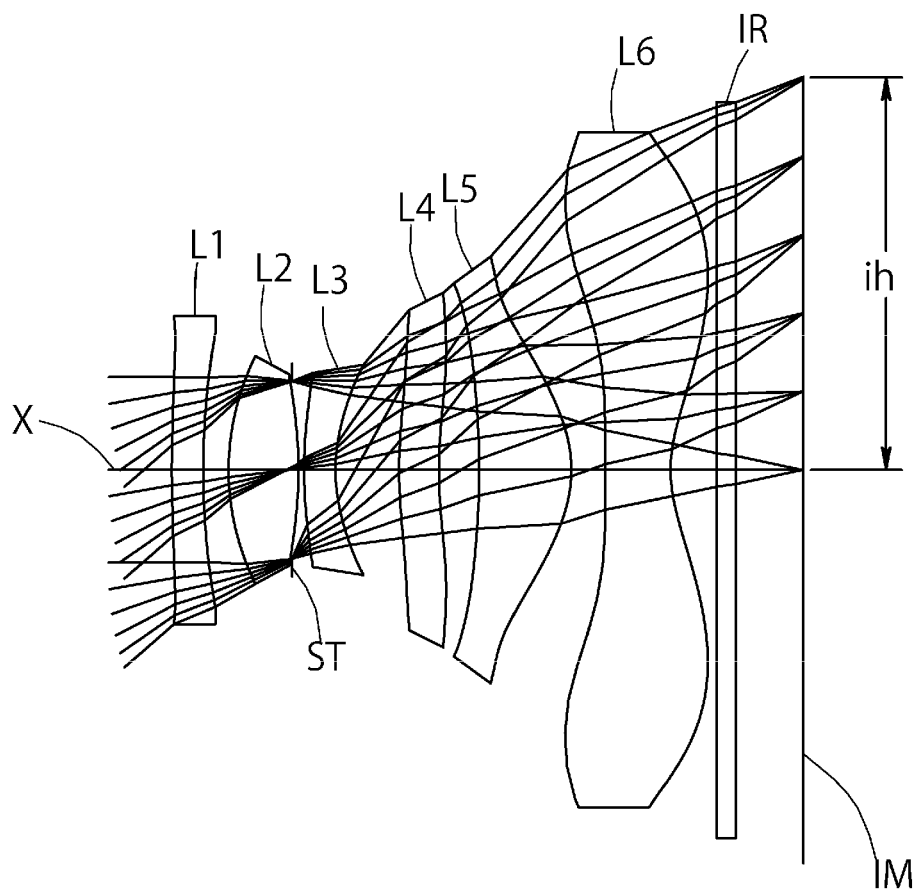
FIG. 19 is a schematic view showing the general configuration of an imaging lens in Example 10.

FIG. 18 shows spherical aberration (mm), astigmatism (mm), and distortion (%) of the imaging lens in Example 9. As shown in FIG. 18, each aberration is corrected properly.

Also, an imaging lens system achieving a wide field of view of about 83 degrees and high brightness with an F-value of about 2.4 is provided. Additionally, a ratio of total track length TTL to twice the maximum image height ih (TTL/2ih) is about 0.91, and compactness of the imaging lens is achieved though the imaging lens is composed of six constituent lenses.

EXAMPLE 10

The basic lens data is shown below in Table 10.

TABLE 10

Numerical Data Example 10

Unit mm f = 6.788
Fno = 2.41
ω(°) = 41.2
ih = 5.980

Surface Data

| Surface Number i | Curvature Radius r | Surface Distance d | Refractive Index Nd | Abbe Number vd |
|---|---|---|---|---|
| (Object) | Infinity | Infinity | | |
| 1* | 22.990 | 0.480 | 1.5438 | 55.57 |
| 2* | 12.703 | 0.382 | | |
| 3* | 3.883 | 1.061 | 1.5438 | 55.57 |
| 4* | −5.988 | −0.098 | | |
| 5(Stop) | Infinity | 0.182 | | |
| 6* | 6.184 | 0.480 | 1.6349 | 23.97 |
| 7* | 2.540 | 0.967 | | |
| 8* | 6.865 | 0.603 | 1.5346 | 56.16 |
| 9* | 6.751 | 0.614 | | |
| 10* | −11.813 | 1.404 | 1.5346 | 56.16 |
| 11* | −1.934 | 0.514 | | |
| 12* | 200.000 | 0.990 | 1.5346 | 56.16 |
| 13* | 2.082 | 0.700 | | |
| 14 | Infinity | 0.300 | 1.5670 | 37.80 |
| 15 | Infinity | 1.035 | | |
| Image Plane | Infinity | | | |

Constituent Lens Data

| Lens | Start Surface | Focal Length |
|---|---|---|
| 1 | 1 | −53.077 |
| 2 | 3 | 4.502 |
| 3 | 6 | −7.155 |
| 4 | 8 | 898.534 |
| 5 | 10 | 4.121 |
| 6 | 12 | −3.942 |

Aspheric Surface Data

| | 1st Surface | 2nd Surface | 3rd Surface | 4th Surface | 6th Surface | 7th Surface |
|---|---|---|---|---|---|---|
| k | 0.000E+00 | 0.000E+00 | −2.112E+00 | 2.494E+00 | 0.000E+00 | −5.961E+00 |
| A4 | −2.551E−03 | 2.856E−04 | 5.801E−03 | 1.944E−02 | −1.484E−02 | 3.120E−03 |
| A6 | 2.643E−04 | 1.237E−04 | −3.784E−04 | −8.731E−03 | 4.760E−03 | 5.392E−03 |
| A8 | −5.843E−05 | −2.392E−05 | −2.656E−04 | 2.457E−03 | −1.640E−03 | −2.763E−03 |
| A10 | 0.000E+00 | 0.000E+00 | 7.712E−05 | −2.706E−04 | 2.789E−04 | 7.058E−04 |
| A12 | 0.000E+00 | 0.000E+00 | 0.000E+00 | 0.000E+00 | 1.831E−05 | −4.676E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | 0.000E+00 | 0.000E+00 | −3.718E+00 | 0.000E+00 | −5.994E+00 |
| A4 | −1.762E−02 | −1.362E−02 | 3.006E−03 | −1.242E−02 | −1.250E−02 | −9.937E−03 |
| A6 | 6.790E−04 | −2.879E−04 | 8.973E−05 | 3.382E−03 | 9.237E−04 | 9.963E−04 |
| A8 | 6.470E−04 | 2.145E−04 | −3.493E−04 | −6.125E−04 | −1.580E−05 | −7.818E−05 |
| A10 | −1.330E−04 | −1.393E−05 | 6.337E−05 | 8.603E−05 | 1.965E−08 | 3.591E−06 |

TABLE 10-continued

| | | | Numerical Data Example 10 | | | |
|---|---|---|---|---|---|---|
| A12 | 8.190E−06 | 1.323E−07 | −3.514E−06 | −4.785E−06 | −4.039E−08 | −8.824E−08 |
| A14 | 0.000E+00 | 0.000E+00 | 0.000E+00 | −6.993E−08 | 2.202E−09 | 9.126E−10 |
| A16 | 0.000E+00 | 0.000E+00 | 0.000E+00 | 9.925E−09 | −3.111E−11 | 0.000E+00 |

According to the imaging lens in Example 10, the first lens L1 has negative refractive power, and as shown in Table 17, the imaging lens satisfies all of conditional expressions (1) and (3), conditional expressions (4) to (8), conditional expression (9-1), conditional expression (10-1), conditional expression (11-1), and conditional expressions (12) to (14).

Figure 20:
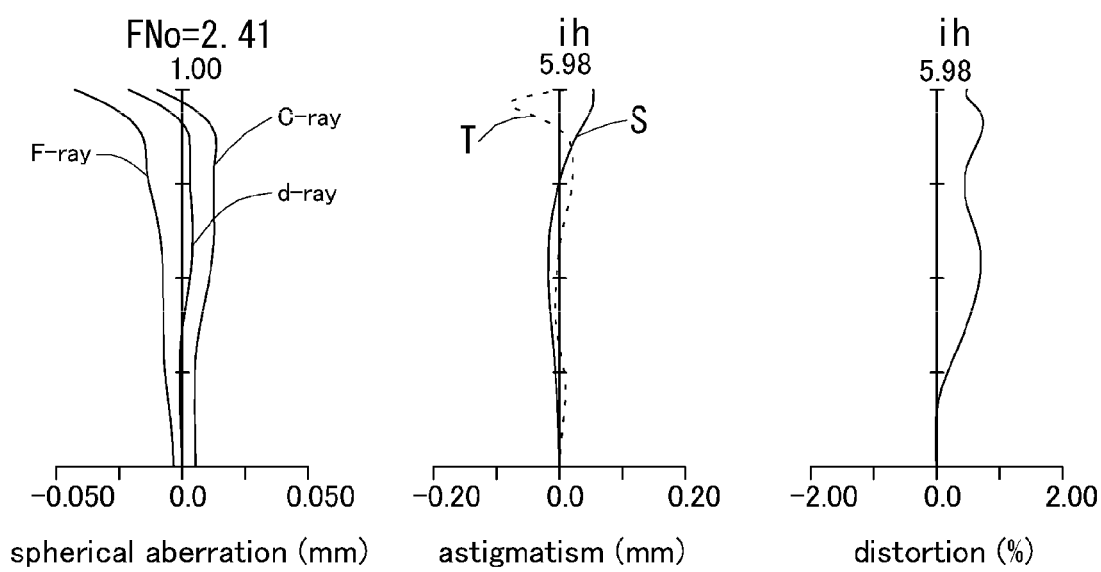
FIG. 20 shows spherical aberration, astigmatism, and distortion of the imaging lens in Example 10.
Figure 21:
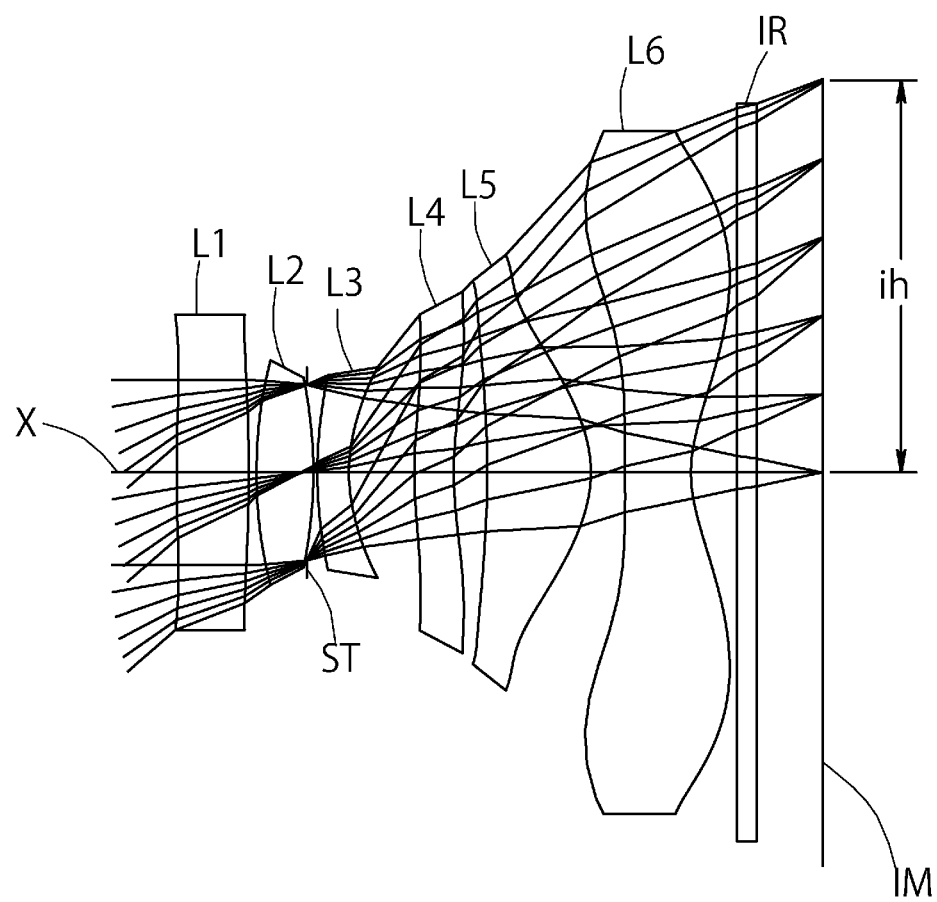
FIG. 21 is a schematic view showing the general configuration of an imaging lens in Example 11.

FIG. 20 shows spherical aberration (mm), astigmatism (mm), and distortion (%) of the imaging lens in Example 10. As shown in FIG. 20, each aberration is corrected properly.

Also, an imaging lens system achieving a wide field of view of about 82 degrees and high brightness with an F-value of about 2.4 is provided. Additionally, a ratio of total track length TTL to twice the maximum image height ih (TTL/2ih) is about 0.79, and compactness of the imaging lens is achieved though the imaging lens is composed of six constituent lenses.

EXAMPLE 11

The basic lens data is shown below in Table 11.

TABLE 11

| Numerical Data Example 11 |
|---|
| Unit mm |
| f = 6.789 |
| Fno = 2.38 |
| ω(°) = 41.2 |
| ih = 5.980 |

Surface Data

| Surface Number i | Curvature Radius r | Surface Distance d | Refractive Index Nd | Abbe Number vd |
|---|---|---|---|---|
| (Object) | Infinity | Infinity | | |
| 1* | 22.222 | 1.098 | 1.5438 | 55.57 |
| 2* | −20.000 | 0.115 | | |
| 3* | 7.660 | 0.866 | 1.5438 | 55.57 |
| 4* | −5.878 | −0.101 | | |
| 5(Stop) | Infinity | 0.158 | | |
| 6* | 5.936 | 0.483 | 1.6349 | 23.97 |
| 7* | 2.502 | 0.994 | | |
| 8* | 6.683 | 0.599 | 1.6349 | 23.97 |
| 9* | 5.834 | 0.510 | | |
| 10* | −13.249 | 1.576 | 1.5346 | 56.16 |
| 11* | −1.915 | 0.515 | | |
| 12* | 77.229 | 1.003 | 1.5346 | 56.16 |
| 13* | 2.053 | 0.700 | | |
| 14 | Infinity | 0.300 | 1.5670 | 37.80 |
| 15 | Infinity | 1.019 | | |
| Image Plane | Infinity | | | |

Constituent Lens Data

| Lens | Start Surface | Focal Length |
|---|---|---|
| 1 | 1 | 19.535 |
| 2 | 3 | 6.257 |
| 3 | 6 | −7.203 |
| 4 | 8 | −99.590 |
| 5 | 10 | 3.994 |
| 6 | 12 | −3.964 |

Aspheric Surface Data

| | 1st Surface | 2nd Surface | 3rd Surface | 4th Surface | 6th Surface | 7th Surface |
|---|---|---|---|---|---|---|
| k | 0.000E+00 | 0.000E−F00 | −1.204E+00 | 2.508E+00 | 0.000E+00 | −6.000E+00 |
| A4 | −5.638E−03 | 2.866E−03 | 6.180E−03 | 1.926E−02 | −1.177E−02 | 4.162E−03 |
| A6 | 3.436E−04 | −4.028E−04 | −1.431E−03 | −8.652E−03 | 5.405E−03 | 5.547E−03 |
| A8 | −2.826E−05 | 5.670E−05 | −4.358E−05 | 2.178E−03 | −1.771E−03 | −2.850E−03 |
| A10 | 0.000E+00 | 0.000E+00 | 4.470E−05 | −2.017E−04 | 2.686E−04 | 6.821E−04 |
| A12 | 0.000E+00 | 0.000E+00 | 0.000E+00 | 0.000E+00 | 1.831E−05 | −3.811E−05 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

TABLE 11-continued

Numerical Data Example 11

|     | 8th Surface | 9th Surface | 10th Surface | 11th Surface | 12th Surface | 13th Surface |
| --- | --- | --- | --- | --- | --- | --- |
| k   | 0.000E+00   | 0.000E+00   | 0.000E+00    | −3.671E+00   | 0.000E+00    | −5.802E+00   |
| A4  | −1.933E−02  | −1.499E−02  | 4.273E−03    | −1.382E−02   | −1.289E−02   | −9.784E−03   |
| A6  | 4.279E−04   | −2.463E−05  | 7.236E−05    | 3.401E−03    | 9.265E−04    | 9.787E−04    |
| A8  | 6.738E−04   | 1.901E−04   | −3.182E−04   | −5.994E−04   | −1.538E−05   | −7.718E−05   |
| A10 | −1.326E−04  | −1.378E−05  | 6.449E−05    | 8.670E−05    | 3.021E−08    | 3.581E−06    |
| A12 | 8.337E−06   | 1.277E−07   | −3.840E−06   | −4.824E−06   | −4.054E−08   | −8.898E−08   |
| A14 | 0.000E+00   | 0.000E+00   | 0.000E+00    | −7.397E−08   | 2.182E−09    | 9.330E−10    |
| A16 | 0.000E+00   | 0.000E+00   | 0.000E+00    | 9.743E−09    | −3.088E−11   | 0.000E+00    |

According to the imaging lens in Example 11, the first lens L1 has positive refractive power, and as shown in Table 17, the imaging lens satisfies all of conditional expressions (1) and (2), and conditional expressions (4) to (14).

Figure 22:
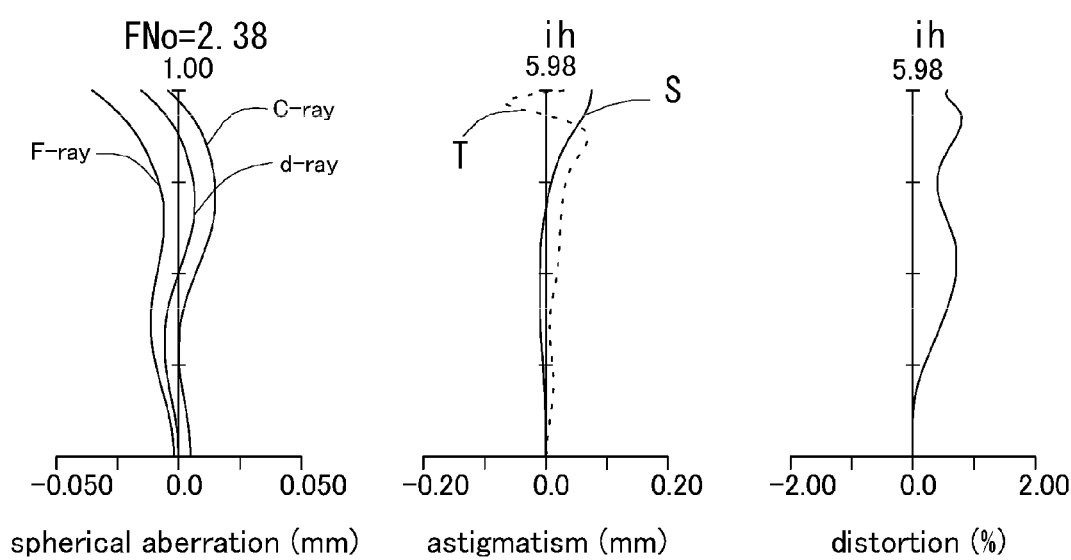
FIG. 22 shows spherical aberration, astigmatism, and distortion of the imaging lens in Example 11.
Figure 23:
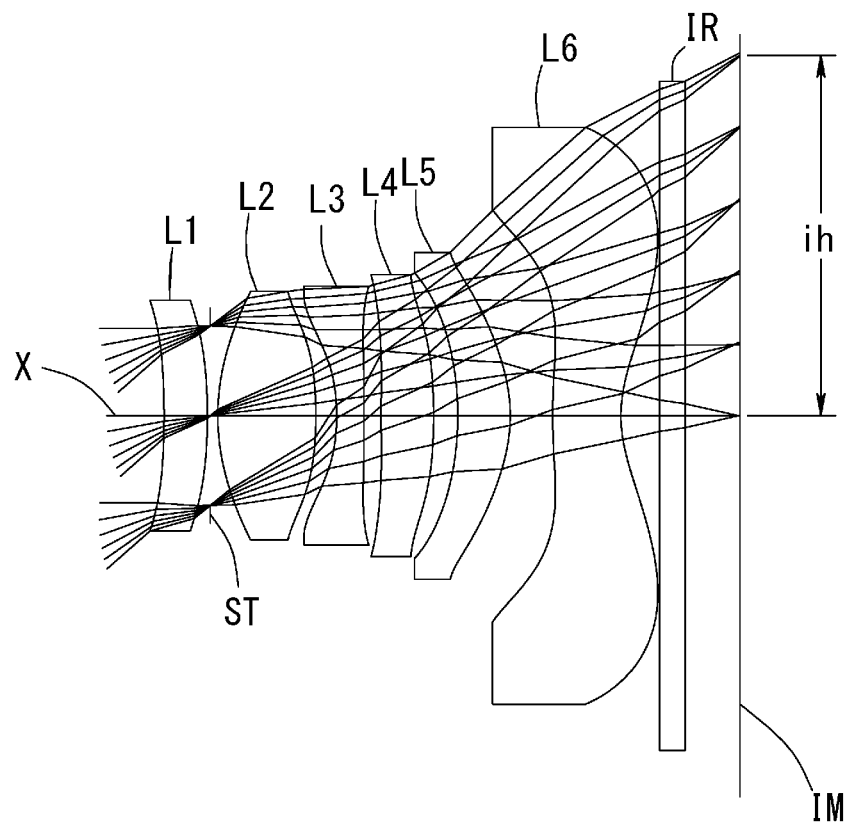
FIG. 23 is a schematic view showing the general configuration of an imaging lens in Example 12.

FIG. 22 shows spherical aberration (mm), astigmatism (mm), and distortion (%) of the imaging lens in Example 11. As shown in FIG. 22, each aberration is corrected properly.

Also, an imaging lens system achieving a wide field of view of about 82 degrees and high brightness with an F-value of about 2.4 is provided. Additionally, a ratio of total track length TTL to twice the maximum image height ih (TTL/2ih) is about 0.81, and compactness of the imaging lens is achieved though the imaging lens is composed of six constituent lenses.

EXAMPLE 12

The basic lens data is shown below in Table 12.

TABLE 12

Numerical Data Example 12

Unit mm f = 3.211
Fno = 2.26
ω(°) = 41.3
ih = 2.934

Surface Data

| Surface Number i | Curvature Radius r | Surface Distance d | Refractive Index Nd | Abbe Number vd |
| --- | --- | --- | --- | --- |
| (Object) | Infinity | Infinity | | |
| 1*  | −6.994 | 0.350 | 1.5348 | 55.66 |
| 2*  | −4.963 | 0.025 | | |
| 3(Stop) | Infinity | 0.060 | | |
| 4*  | 1.810 | 0.795 | 1.5348 | 55.66 |
| 5*  | −3.355 | 0.168 | | |
| 6*  | −1.663 | 0.220 | 1.6142 | 25.58 |
| 7*  | 44.516 | 0.141 | | |
| 8*  | 20.435 | 0.424 | 1.5438 | 55.57 |
| 9*  | −5.049 | 0.197 | | |
| 10* | −2.566 | 0.425 | 1.6142 | 25.58 |
| 11* | −1.283 | 0.345 | | |
| 12* | 4.446 | 0.553 | 1.5348 | 55.66 |
| 13* | 1.086 | 0.310 | | |
| 14  | Infinity | 0.210 | 1.5168 | 64.20 |
| 15  | Infinity | 0.448 | | |
| Image Plane | Infinity | | | |

Constituent Lens Data

| Lens | Start Surface | Focal Length |
| --- | --- | --- |
| 1 | 1 | 30.143 |
| 2 | 4 | 2.323 |
| 3 | 6 | −2.606 |
| 4 | 8 | 7.489 |
| 5 | 10 | 3.710 |
| 6 | 12 | −2.850 |

Aspheric Surface Data

|    | 1st Surface | 2nd Surface | 4th Surface | 5th Surface | 6th Surface | 7th Surface |
| --- | --- | --- | --- | --- | --- | --- |
| k  | 0.000E+00  | 0.000E−F00 | 0.000E+00  | −3.299E+01 | 5.294E−01  | 0.000E+00  |
| A4 | −6.576E−02 | −1.086E−01 | −3.724E−02 | −2.511E−01 | −2.797E−01 | −1.624E−01 |
| A6 | −1.905E−02 | 5.177E−02  | −3.117E−03 | −6.367E−02 | 4.044E−01  | 2.744E−01  |

TABLE 12-continued

Numerical Data Example 12

| | | | | | | |
|---|---|---|---|---|---|---|
| A8 | 1.842E−02 | 0.000E+00 | 0.000E+00 | 3.180E−01 | 1.196E−01 | 1.581E−02 |
| A10 | 1.144E−02 | 0.000E+00 | 0.000E+00 | −1.237E−01 | −2.266E−01 | −2.271E−01 |
| A12 | −8.121E−03 | 0.000E+00 | 0.000E+00 | −1.838E−03 | 8.086E−02 | 1.212E−01 |
| A14 | −3.256E−03 | 0.000E+00 | 0.000E+00 | −9.313E−04 | −4.465E−03 | −6.205E−03 |
| A16 | 2.389E−03 | 0.000E+00 | 0.000E+00 | −2.150E−04 | −2.657E−04 | −7.512E−04 |

| | 8th Surface | 9th Surface | 10th Surface | 11th Surface | 12th Surface | 13th Surface |
|---|---|---|---|---|---|---|
| k | 0.000E+00 | 1.340E+01 | 2.105E+00 | −5.669E−01 | 3.985E+00 | −4.897E+00 |
| A4 | −1.073E−01 | −1.323E−01 | 4.015E−02 | 1.974E−01 | −1.702E−01 | −8.452E−02 |
| A6 | −6.162E−02 | 6.665E−02 | −1.722E−02 | −1.590E−02 | 3.864E−02 | 3.487E−02 |
| A8 | 2.253E−01 | 2.339E−02 | 1.017E−02 | 1.100E−01 | −2.599E−02 | −1.280E−02 |
| A10 | −1.617E−01 | 7.464E−03 | 7.719E−03 | −5.559E−02 | 1.242E−02 | 3.048E−03 |
| A12 | 2.626E−02 | −6.809E−03 | −8.346E−03 | 1.515E−02 | −3.012E−03 | −4.975E−04 |
| A14 | 4.458E−03 | 4.644E−04 | 3.931E−04 | −4.959E−05 | 4.974E−04 | 5.301E−05 |
| A16 | 7.034E−04 | −6.030E−05 | 1.442E−04 | −2.132E−05 | −4.500E−05 | −2.862E−06 |

According to the imaging lens in Example 12, the first lens L1 has positive refractive power, and as shown in Table 17, the imaging lens satisfies all of conditional expressions (1) and (2), conditional expressions (4) to (8), conditional expression (9-1), conditional expression (10-1), conditional expression (11-1), and conditional expressions (12) to (14).

Figure 24:
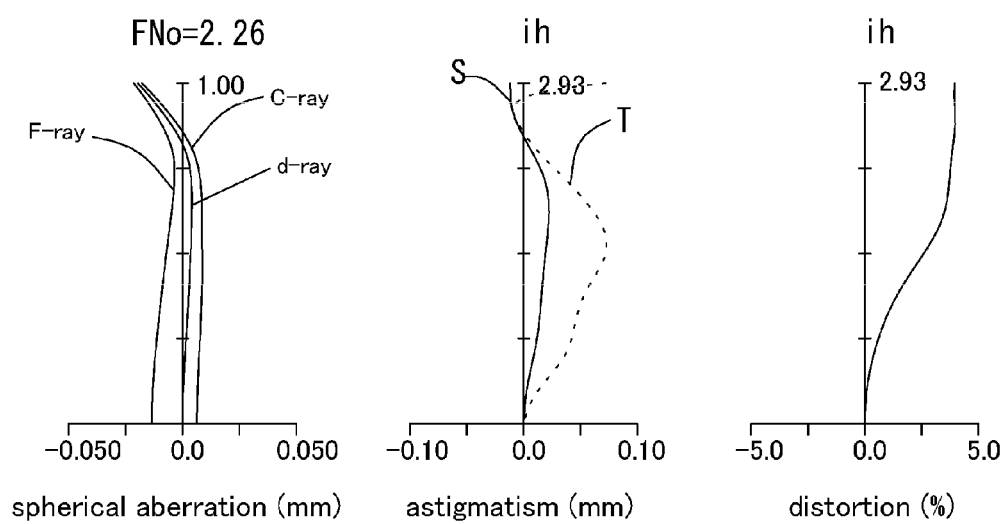
FIG. 24 shows spherical aberration, astigmatism, and distortion of the imaging lens in Example 12.
Figure 25:
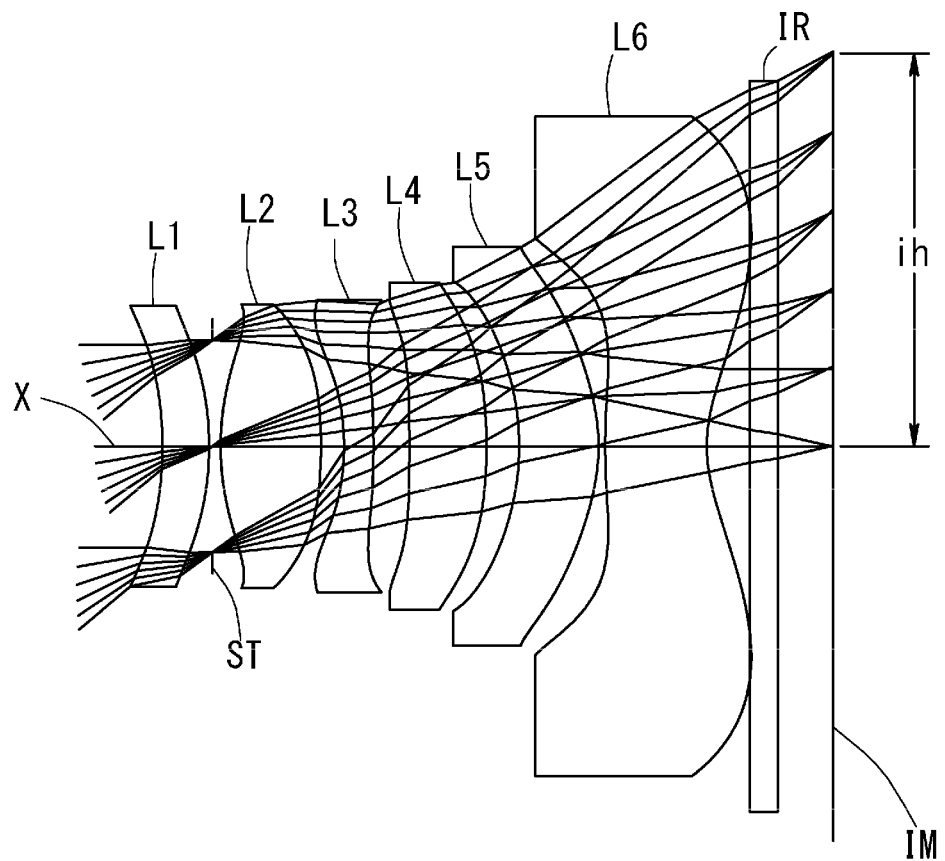
FIG. 25 is a schematic view showing the general configuration of an imaging lens in Example 13.

FIG. 24 shows spherical aberration (mm), astigmatism (mm), and distortion (%) of the imaging lens in Example 12. As shown in FIG. 24, each aberration is corrected properly.

Also, an imaging lens system achieving a wide field of view of about 82 degrees and high brightness with an F-value of about 2.3 is provided. Additionally, a ratio of total track length TTL to twice the maximum image height ih (TTL/2ih) is about 0.78, and compactness of the imaging lens is achieved though the imaging lens is composed of six constituent lenses.

EXAMPLE 13

The basic lens data is shown below in Table 13.

TABLE 13

Numerical Data Example 13

Unit mm f = 3.408
Fno = 2.26
ω(°) = 40.0
ih = 2.934

Surface Data

| Surface Number i | Curvature Radius r | Surface Distance d | Refractive Index Nd | Abbe Number vd |
|---|---|---|---|---|
| (Object) | Infinity | Infinity | | |
| 1* | −2.886 | 0.350 | 1.5348 | 55.66 |
| 2* | −2.233 | 0.025 | | |
| 3(Stop) | Infinity | 0.060 | | |
| 4* | 2.096 | 0.747 | 1.5348 | 55.66 |
| 5* | −4.044 | 0.173 | | |
| 6* | −2.032 | 0.220 | 1.6349 | 23.97 |
| 7* | −7.701 | 0.268 | | |
| 8* | −25.630 | 0.574 | 1.5438 | 55.57 |
| 9* | −4.045 | 0.246 | | |
| 10* | −1.885 | 0.591 | 1.6142 | 25.58 |
| 11* | −1.421 | 0.047 | | |
| 12* | 4.133 | 0.759 | 1.5348 | 55.66 |
| 13* | 1.088 | 0.320 | | |
| 14 | Infinity | 0.210 | 1.5168 | 64.20 |
| 15 | Infinity | 0.413 | | |
| Image Plane | Infinity | | | |

Constituent Lens Data

| Lens | Start Surface | Focal Length |
|---|---|---|
| 1 | 1 | 15.548 |
| 2 | 4 | 2.696 |
| 3 | 6 | −4.414 |
| 4 | 8 | 8.751 |

TABLE 13-continued

Numerical Data Example 13

| 5 | 10 | 6.337 |
|---|----|-------|
| 6 | 12 | −3.022 |

Aspheric Surface Data

|  | 1st Surface | 2nd Surface | 4th Surface | 5th Surface | 6th Surface | 7th Surface |
|---|---|---|---|---|---|---|
| k   | 0.000E+00  | 0.000E+00  | 0.000E+00  | −1.595E+01 | 7.858E−01  | 0.000E+00  |
| A4  | −7.311E−02 | −1.490E−02 | 1.401E−02  | −2.358E−01 | −2.803E−01 | −1.510E−01 |
| A6  | 5.388E−02  | −2.334E−03 | −2.387E−02 | −5.719E−02 | 3.673E−01  | 2.863E−01  |
| A8  | −4.853E−02 | 2.356E−02  | −7.272E−02 | 2.254E−01  | 1.186E−01  | 1.806E−02  |
| A10 | 3.390E−02  | 0.000E+00  | 0.000E+00  | −1.333E−01 | −1.808E−01 | −2.054E−01 |
| A12 | 3.805E−04  | 0.000E+00  | 0.000E+00  | 2.467E−02  | 3.472E−02  | 1.547E−01  |
| A14 | −4.346E−03 | 0.000E+00  | 0.000E+00  | −1.423E−02 | 6.108E−03  | −3.450E−02 |
| A16 | 0.000E+00  | 0.000E+00  | 0.000E+00  | 0.000E+00  | 0.000E+00  | 0.000E+00  |

|  | 8th Surface | 9th Surface | 10th Surface | 11th Surface | 12th Surface | 13th Surface |
|---|---|---|---|---|---|---|
| k   | 0.000E+00  | 8.928E+00  | 1.189E+00  | −4.716E−01 | 4.100E+00  | −5.295E+00 |
| A4  | −9.634E−02 | −1.032E−01 | 6.200E−02  | 1.931E−01  | −1.732E−01 | −6.714E−02 |
| A6  | −1.040E−01 | 3.758E−02  | −2.942E−02 | −1.579E−01 | 2.814E−02  | 2.874E−02  |
| A8  | 1.942E−01  | 2.211E−04  | 3.234E−02  | 1.070E−01  | −2.561E−02 | −1.137E−02 |
| A10 | −1.583E−01 | 3.015E−03  | −7.435E−02 | −5.399E−02 | 1.107E−02  | 3.021E−03  |
| A12 | 4.658E−02  | −5.074E−03 | −9.914E−03 | 1.521E−02  | −3.305E−03 | −5.263E−04 |
| A14 | 1.299E−02  | 4.069E−03  | 6.517E−03  | −1.382E−03 | 5.822E−04  | 5.301E−05  |
| A16 | 0.000E+00  | 0.000E+00  | 0.000E+00  | 0.000E+00  | 4.300E−05  | −2.313E−06 |

According to the imaging lens in Example 13, the first lens L1 has positive refractive power, and as shown in Table 17, the imaging lens satisfies all of conditional expressions (1) and (2), conditional expressions (4) to (8), conditional expression (9-1), conditional expression (10-1), conditional expression (11-1), and conditional expressions (12) to (14).

Figure 26:
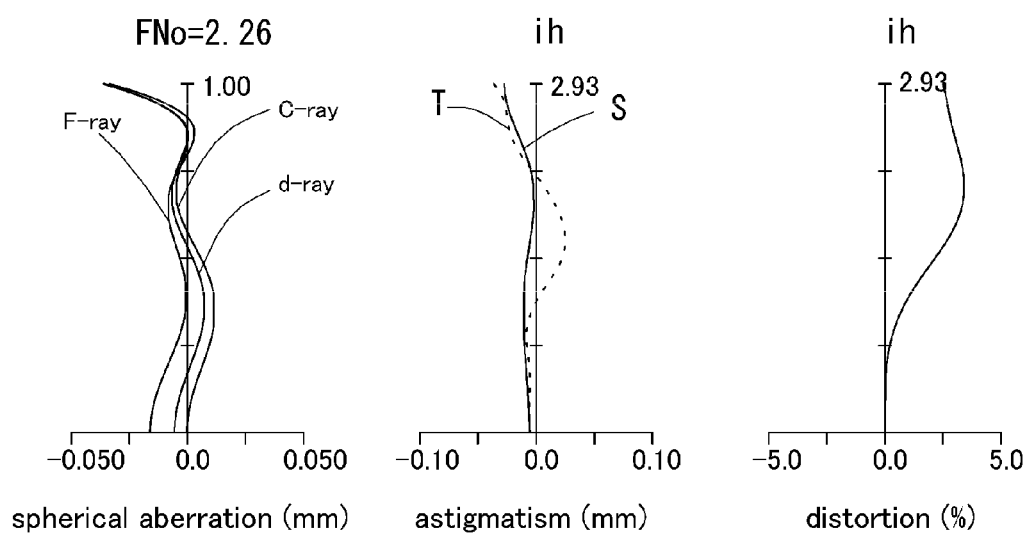
FIG. 26 shows spherical aberration, astigmatism, and distortion of the imaging lens in Example 13.
Figure 27:
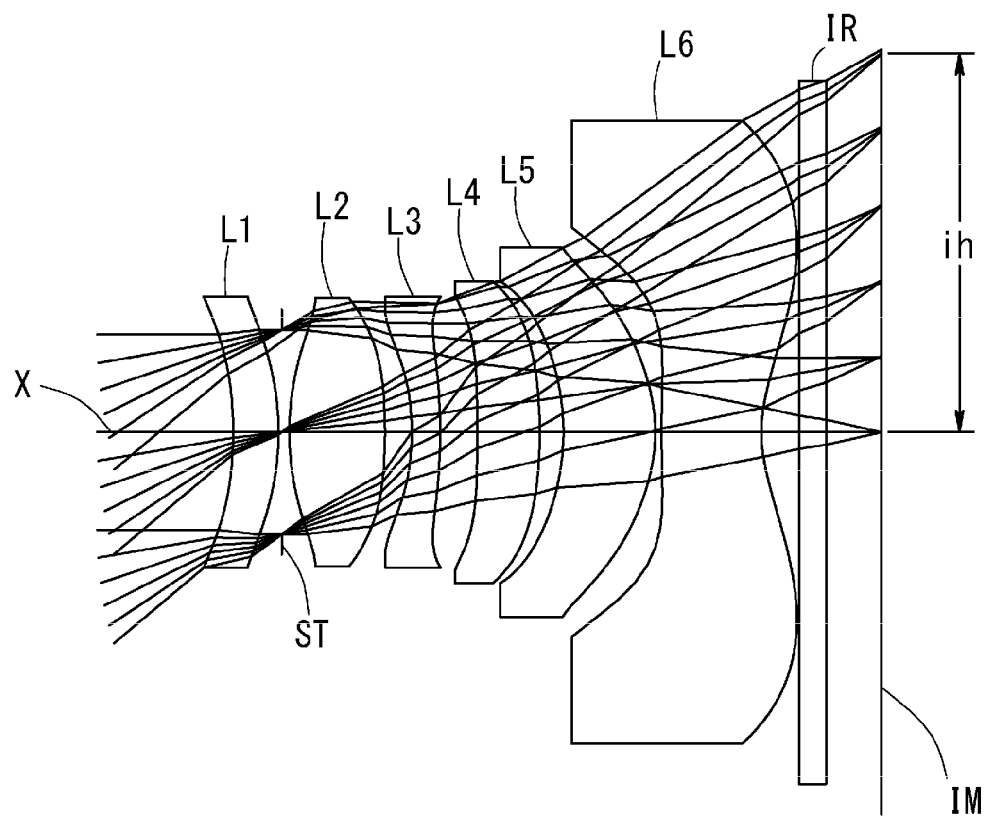
FIG. 27 is a schematic view showing the general configuration of an imaging lens in Example 14.

FIG. 26 shows spherical aberration (mm), astigmatism (mm), and distortion (%) of the imaging lens in Numerical Example 13. As shown in FIG. 26, each aberration is corrected properly.

Also, an imaging lens system achieving a wide field of view of about 80 degrees and high brightness with an F-value of about 2.3 is provided. Additionally, a ratio of total track length TTL to twice the maximum image height ih (TTL/2ih) is about 0.84, and compactness of the imaging lens is achieved though the imaging lens is composed of six constituent lenses.

EXAMPLE 14

The basic lens data is shown below in Table 14.

TABLE 14

Numerical Data Example 14

Unit mm f = 3.407
Fno = 2.25
ω(°) = 40.1
ih = 2.934

Surface Data

| Surface Number i | Curvature Radius r | Surface Distance d | Refractive Index Nd | Abbe Number vd |
|---|---|---|---|---|
| (Object) | Infinity | Infinity |  |  |
| 1* | −3.087 | 0.350 | 1.5348 | 55.66 |
| 2* | −2.196 | 0.025 |  |  |
| 3(Stop) | Infinity | 0.060 |  |  |
| 4* | 2.246 | 0.738 | 1.5348 | 55.66 |
| 5* | −5.122 | 0.206 |  |  |
| 6* | −2.265 | 0.220 | 1.6349 | 23.97 |
| 7* | −6.043 | 0.288 |  |  |
| 8* | −20.851 | 0.483 | 1.5438 | 55.57 |
| 9* | −4.027 | 0.183 |  |  |
| 10* | −1.807 | 0.711 | 1.6142 | 25.58 |
| 11* | −1.297 | 0.047 |  |  |
| 12* | 6.190 | 0.774 | 1.6142 | 25.58 |
| 13* | 1.176 | 0.290 |  |  |
| 14 | Infinity | 0.210 | 1.5168 | 64.20 |
| 15 | Infinity | 0.428 |  |  |
| Image Plane | Infinity |  |  |  |

TABLE 14-continued

Numerical Data Example 14

Constituent Lens Data

| Lens | Start Surface | Focal Length |
|---|---|---|
| 1 | 1 | 12.508 |
| 2 | 4 | 3.025 |
| 3 | 6 | −5.839 |
| 4 | 8 | 9.086 |
| 5 | 10 | 4.892 |
| 6 | 12 | −2.511 |

Aspheric Surface Data

|     | 1st Surface | 2nd Surface | 4th Surface | 5th Surface | 6th Surface | 7th Surface |
|-----|-------------|-------------|-------------|-------------|-------------|-------------|
| k   | 0.000E+00   | 0.000E+00   | 0.000E+00   | −4.649E+01  | 1.256E+00   | 0.000E+00   |
| A4  | −8.829E−02  | −1.267E−02  | 2.939E−02   | −2.237E−01  | −2.829E−01  | −1.643E−01  |
| A6  | 5.681E−02   | 1.221E−02   | −1.948E−02  | −4.588E−02  | 3.552E−01   | 2.857E−01   |
| A8  | −2.680E−02  | 1.892E−02   | −4.638E−02  | 2.215E−01   | 1.125E−01   | 1.984E−02   |
| A10 | 3.073E−02   | 0.000E+00   | 0.000E+00   | −1.445E−01  | −1.840E−01  | −2.044E−01  |
| A12 | −1.770E−02  | 0.000E+00   | 0.000E+00   | 1.533E−02   | 3.501E−02   | 1.561E−01   |
| A14 | 4.523E−03   | 0.000E+00   | 0.000E+00   | 2.980E−03   | 1.028E−02   | −3.104E−02  |
| A16 | 0.000E+00   | 0.000E+00   | 0.000E+00   | 3.712E−04   | 4.907E−04   | −2.628E−04  |

|     | 8th Surface | 9th Surface | 10th Surface | 11th Surface | 12th Surface | 13th Surface |
|-----|-------------|-------------|--------------|--------------|--------------|--------------|
| k   | 0.000E+00   | 9.188E+00   | 1.181E+00    | −4.577E−01   | 1.039E+00    | −5.683E+00   |
| A4  | −7.447E−02  | −6.094E−02  | 6.994E−02    | 1.523E−01    | −1.859E−01   | −7.655E−02   |
| A6  | −1.123E−01  | 1.883E−02   | −4.090E−02   | −1.523E−01   | 2.083E−02    | 3.040E−02    |
| A8  | 1.666E−01   | −1.224E−02  | 2.777E−02    | 1.097E−01    | −1.927E−02   | −1.144E−02   |
| A10 | −1.725E−01  | −3.312E−03  | −5.877E−03   | −5.331E−02   | 1.205E−02    | 3.031E−03    |
| A12 | 4.868E−02   | −6.852E−03  | −7.230E−03   | 1.535E−02    | −3.271E−03   | −5.277E−04   |
| A14 | 2.563E−02   | 5.909E−03   | 5.464E−03    | −1.272E−03   | 5.442E−04    | 5.271E−05    |
| A16 | 3.575E−04   | 7.979E−06   | 5.198E−05    | −1.670E−06   | −1.275E−05   | −2.263E−06   |

According to the imaging lens in Example 14, the first lens L1 has positive refractive power, and as shown in Table 17, the imaging lens satisfies all of conditional expressions (1) and (2), conditional expressions (4) to (8), conditional expression (9-1), conditional expression (10-1), conditional expression (11-1), and conditional expressions (12) to (14).

Figure 28:
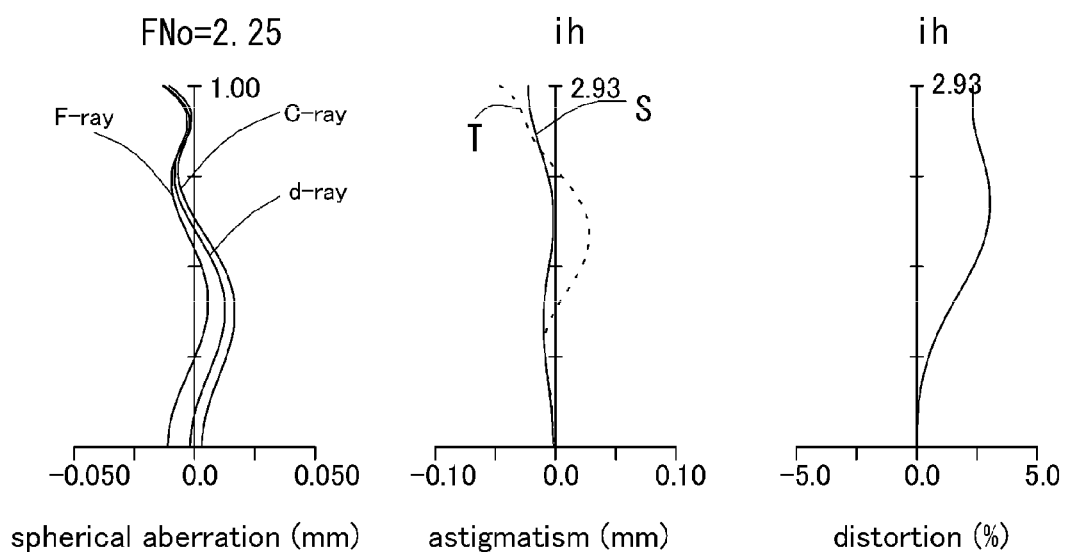
FIG. 28 shows spherical aberration, astigmatism, and distortion of the imaging lens in Example 14.
Figure 29:
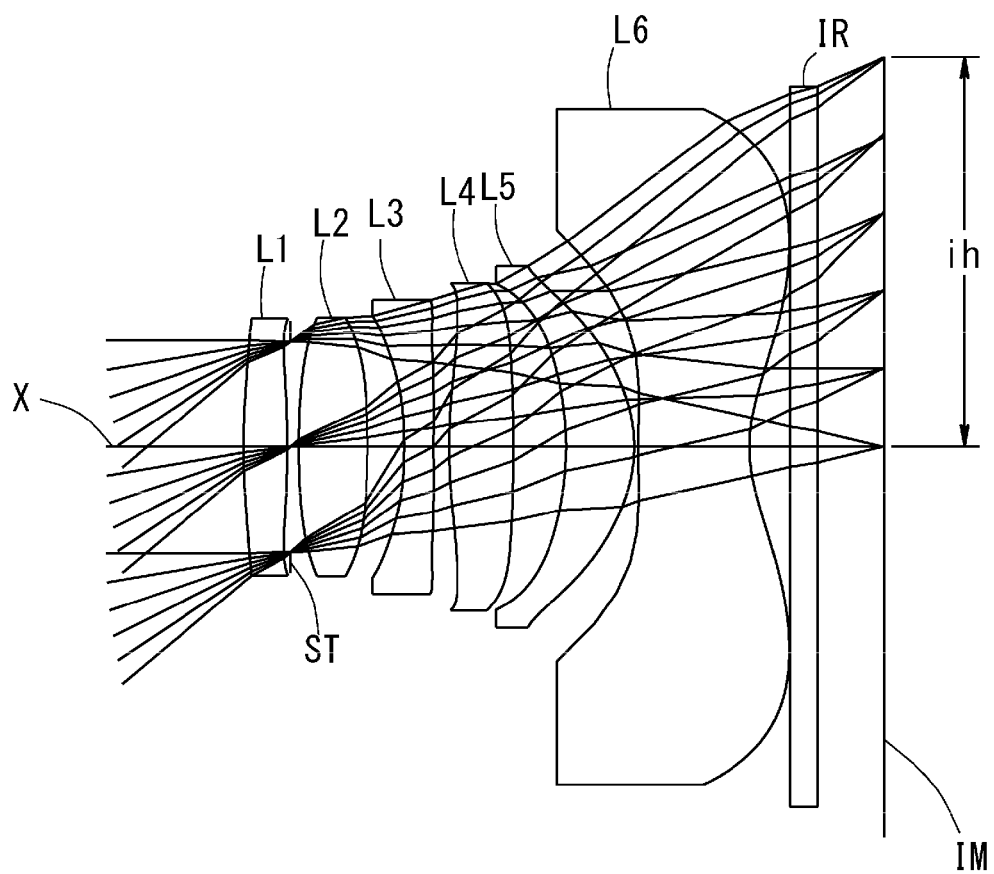
FIG. 29 is a schematic view showing the general configuration of an imaging lens in Example 15.

FIG. 28 shows spherical aberration (mm), astigmatism (mm), and distortion (%) of the imaging lens in Example 14. As shown in FIG. 28, each aberration is corrected properly.

Also, an imaging lens system achieving a wide field of view of about 80 degrees and high brightness with an F-value of about 2.3 is provided. Additionally, a ratio of total track length TTL to twice the maximum image height ih (TTL/2ih) is about 0.84, and compactness of the imaging lens is achieved though the imaging lens is composed of six constituent lenses.

EXAMPLE 15

The basic lens data is shown below in Table 15.

TABLE 15

Numerical Data Example 15

Unit mm f = 3.407
Fno = 2.13
ω(°) = 40.1
ih = 2.934

Surface Data

| Surface Number i | Curvature Radius r | Surface Distance d | Refractive Index Nd | Abbe Number vd |
|---|---|---|---|---|
| (Object) | Infinity | Infinity | | |
| 1* | 4.622 | 0.332 | 1.5348 | 55.66 |
| 2* | −7.538 | 0.025 | | |
| 3(Stop) | Infinity | 0.060 | | |
| 4* | 6.029 | 0.513 | 1.5348 | 55.66 |
| 5* | −10.935 | 0.278 | | |
| 6* | −3.418 | 0.220 | 1.6349 | 23.97 |
| 7* | 16.109 | 0.115 | | |
| 8* | 3.871 | 0.485 | 1.5348 | 55.66 |
| 9* | −10.847 | 0.396 | | |

TABLE 15-continued

Numerical Data Example 15

| | | | | |
|---|---|---|---|---|
| 10* | −2.310 | 0.509 | 1.6142 | 25.58 |
| 11* | −1.093 | 0.030 | | |
| 12* | 10.232 | 0.839 | 1.6142 | 25.58 |
| 13* | 1.103 | 0.300 | | |
| 14 | Infinity | 0.210 | 1.5168 | 64.20 |
| 15 | Infinity | 0.502 | | |
| Image Plane | Infinity | | | |

Constituent Lens Data

| Lens | Start Surface | Focal Length |
|---|---|---|
| 1 | 1 | 5.409 |
| 2 | 4 | 7.344 |
| 3 | 6 | −4.421 |
| 4 | 8 | 5.396 |
| 5 | 10 | 2.914 |
| 6 | 12 | −2.085 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 0.000E+00 | 2.043E+01 | 3.536E+00 | 0.000E+00 |
| A4 | −7.515E−02 | −2.447E−03 | 4.193E−02 | −1.500E−01 | −2.737E−01 | −2.254E−01 |
| A6 | 5.369E−03 | 2.031E−02 | 3.248E−02 | −2.249E−02 | 3.051E−01 | 2.713E−01 |
| A8 | −9.424E−03 | 6.836E−02 | −7.829E−02 | 1.238E−01 | 5.906E−02 | 3.135E−02 |
| A10 | 7.979E−02 | 0.000E+00 | 0.000E+00 | −1.354E−01 | −2.347E−01 | −2.077E−01 |
| A12 | −4.129E−02 | 0.000E+00 | 0.000E+00 | 5.327E−02 | 3.294E−02 | 1.298E−01 |
| A14 | −2.026E−03 | 0.000E+00 | 0.000E+00 | 5.284E−03 | 2.736E−02 | −5.105E−02 |
| A16 | 0.000E+00 | 0.000E+00 | 0.000E+00 | −7.114E−03 | 1.037E−03 | 1.073E−02 |

| | 8th Surface | 9th Surface | 10th Surface | 11th Surface | 12th Surface | 13th Surface |
|---|---|---|---|---|---|---|
| k | 0.000E+00 | −9.189E+01 | 1.692E+00 | −4.947E−01 | 1.558E+01 | −5.340E+00 |
| A4 | −4.894E−02 | 9.285E−03 | 5.375E−02 | 1.456E−01 | −2.032E−01 | −8.327E−02 |
| A6 | −7.720E−02 | −6.617E−03 | −7.348E−02 | −1.449E−01 | 4.289E−02 | 3.605E−02 |
| A8 | 1.597E−01 | −2.617E−02 | 2.851E−02 | 1.141E−01 | −7.925E−03 | −1.285E−02 |
| A10 | −1.771E−01 | 5.633E−05 | −3.155E−03 | −5.496E−02 | 1.116E−02 | 3.190E−03 |
| A12 | 6.607E−02 | −4.387E−03 | −6.132E−03 | 1.502E−02 | −5.480E−03 | −5.268E−04 |
| A14 | 3.202E−02 | 5.020E−03 | 4.392E−03 | −5.338E−04 | 1.049E−04 | 4.953E−05 |
| A16 | −2.240E−02 | −1.607E−03 | −3.282E−03 | 4.992E−04 | 2.505E−04 | −1.999E−06 |

According to the imaging lens in Example 15, the first lens L1 has positive refractive power, and as shown in Table 17, satisfies conditional expressions (1) and (2), conditional expressions (4) to (8), conditional expression (9-1), conditional expression (10-1), conditional expression (11-1), and conditional expressions (12) to (14).

Figure 30:
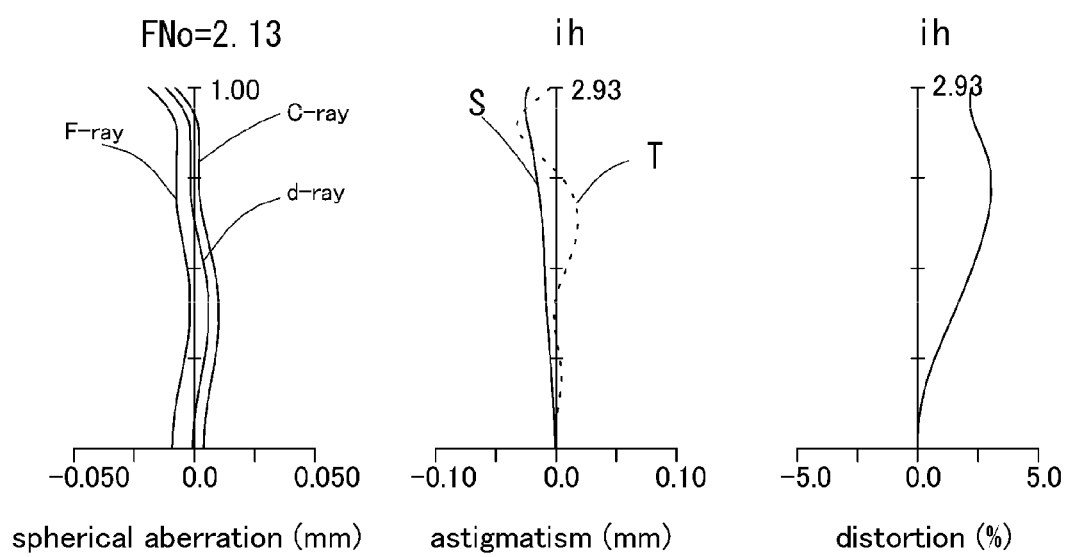
FIG. 30 shows spherical aberration, astigmatism, and distortion of the imaging lens in Example 15.
Figure 31:
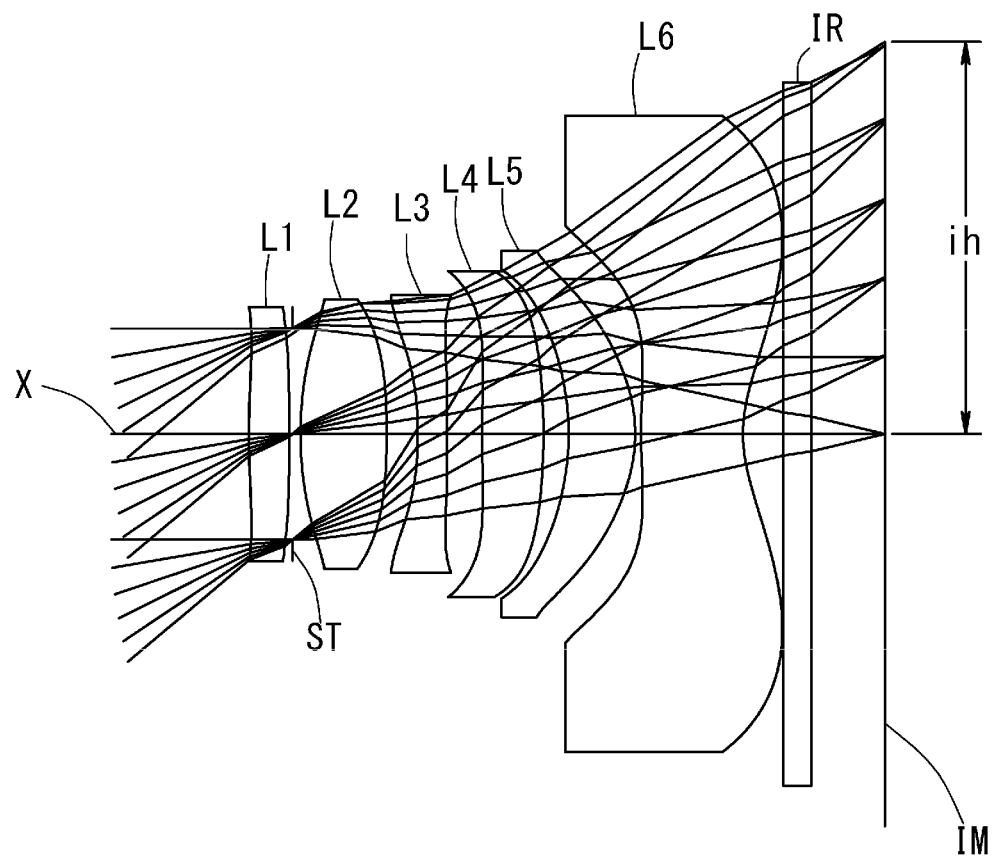
FIG. 31 is a schematic view showing the general configuration of an imaging lens in Example 16.

FIG. 30 shows spherical aberration (mm), astigmatism (mm), and distortion (%) of the imaging lens in Example 15. As shown in FIG. 30, each aberration is corrected properly.

Also, an imaging lens system achieving a wide field of view of about 80 degrees and high brightness with an F-value of about 2.1 is provided. Additionally, a ratio of total track length TTL to twice the maximum image height ih (TTL/2ih) is about 0.81, and compactness of the imaging lens is achieved though the imaging lens is composed of six constituent lenses.

EXAMPLE 16

The basic lens data is shown below in Table 16.

TABLE 16

Numerical Data Example 16

Unit mm f = 3.408
Fno = 2.16
ω(°) = 40.1
ih = 2.934

Surface Data

| Surface Number i | Curvature Radius r | Surface Distance d | Refractive Index Nd | Abbe Number vd |
|---|---|---|---|---|
| (Object) | Infinity | Infinity | | |
| 1* | 5.840 | 0.301 | 1.5348 | 55.66 |

TABLE 16-continued

Numerical Data Example 16

| | | | | |
|---|---|---|---|---|
| 2* | −39.848 | 0.025 | | |
| 3(Stop) | Infinity | 0.060 | | |
| 4* | 2.811 | 0.643 | 1.5348 | 55.66 |
| 5* | −5.467 | 0.231 | | |
| 6* | −3.109 | 0.220 | 1.6349 | 23.97 |
| 7* | 90.980 | 0.261 | | |
| 8* | 17.130 | 0.457 | 1.5438 | 55.57 |
| 9* | −5.316 | 0.187 | | |
| 10* | −1.937 | 0.496 | 1.6375 | 23.25 |
| 11* | −1.160 | 0.045 | | |
| 12* | 5.287 | 0.760 | 1.6142 | 25.58 |
| 13* | 1.075 | 0.300 | | |
| 14 | Infinity | 0.210 | 1.5168 | 64.20 |
| 15 | Infinity | 0.547 | | |
| Image Plane | Infinity | | | |

Constituent Lens Data

| Lens | Start Surface | Focal Length |
|---|---|---|
| 1 | 1 | 9.545 |
| 2 | 4 | 3.568 |
| 3 | 6 | −4.730 |
| 4 | 8 | 7.514 |
| 5 | 10 | 3.633 |
| 6 | 12 | −2.358 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 0.000E+00 | −4.727E+01 | 2.264E+00 | 0.000E+00 |
| A4 | −9.323E−02 | −4.240E−02 | 3.821E−02 | −1.539E−01 | −2.714E−01 | −1.969E−01 |
| A6 | 8.517E−03 | −3.908E−02 | −1.414E−02 | −2.792E−02 | 3.104E−01 | 2.818E−01 |
| A8 | −4.250E−02 | 4.395E−02 | −3.106E−02 | 1.476E−01 | 7.640E−02 | 1.678E−02 |
| A10 | 5.241E−02 | 0.000E+00 | 0.000E+00 | −1.605E−01 | −2.000E−01 | −2.039E−01 |
| A12 | −1.307E−02 | 0.000E+00 | 0.000E+00 | 3.622E−02 | 4.064E−02 | 1.511E−01 |
| A14 | −2.711E−03 | 0.000E+00 | 0.000E+00 | 1.528E−02 | 2.390E−02 | −3.691E−02 |
| A16 | 0.000E+00 | 0.000E+00 | 0.000E+00 | −5.240E−04 | 3.270E−03 | −9.300E−04 |

| | 8th Surface | 9th Surface | 10th Surface | 11th Surface | 12th Surface | 13th Surface |
|---|---|---|---|---|---|---|
| k | 0.000E+00 | 7.694E+00 | 1.151E+00 | −4.662E−01 | −6.929E+00 | −5.139E+00 |
| A4 | −4.891E−02 | −3.174E−02 | 7.054E−02 | 1.617E−01 | −2.034E−01 | −8.601E−02 |
| A6 | −1.083E−01 | 5.541E−03 | −4.921E−02 | −1.480E−01 | 3.476E−02 | 3.514E−02 |
| A8 | 1.571E−01 | −1.941E−02 | 2.925E−02 | 1.106E−01 | −1.497E−02 | −1.246E−02 |
| A10 | −1.735E−01 | −2.416E−03 | −7.971E−03 | −5.400E−02 | 1.146E−02 | 3.096E−03 |
| A12 | 5.325E−02 | −6.383E−03 | −7.906E−03 | 1.552E−02 | −3.971E−03 | −5.230E−04 |
| A14 | 2.623E−02 | 4.417E−03 | 5.456E−03 | −8.732E−04 | 4.677E−04 | 5.200E−05 |
| A16 | −1.404E−02 | −1.796E−03 | −6.134E−04 | 2.266E−04 | 5.244E−05 | −2.269E−06 |

According to the imaging lens in Example 16, the first lens L1 has positive refractive power, and as shown in Table 17, the imaging lens satisfies conditional expressions (1) and (2), conditional expressions (4) to (8), conditional expression (9-1), conditional expression (10-1), conditional expression (11-1), and conditional expressions (12) to (14).

Figure 32:
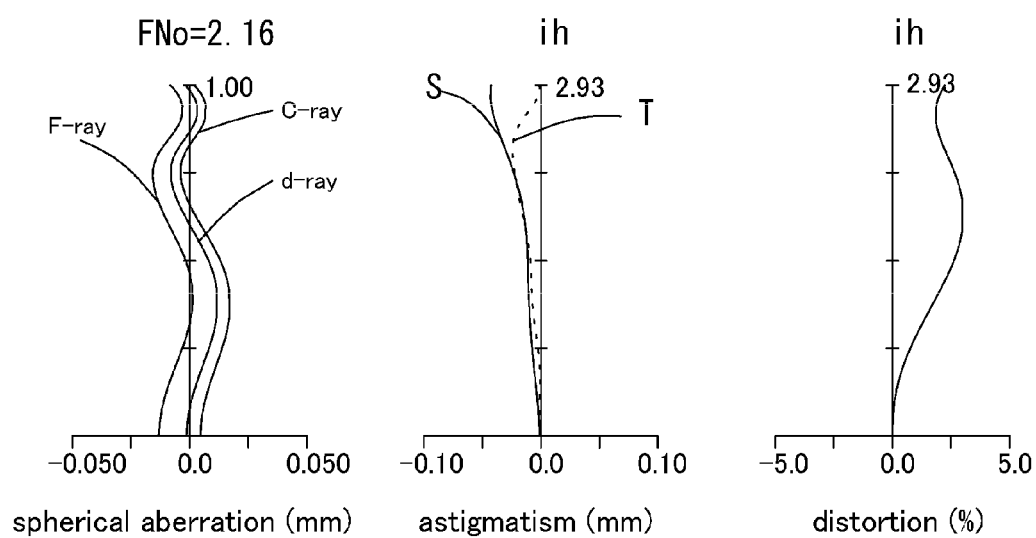
FIG. 32 shows spherical aberration, astigmatism, and distortion of the imaging lens in Example 16.

FIG. 32 shows spherical aberration (mm), astigmatism (mm), and distortion (%) of the imaging lens in Example 16. As shown in FIG. 32, each aberration is corrected properly.

Also, an imaging lens system achieving a wide field of view of about 80 degrees and high brightness with an F-value of about 2.2 is provided. Additionally, a ratio of total track length TTL to twice the maximum image height ih (TTL/2ih) is about 0.80, and compactness of the imaging lens is achieved though the imaging lens is composed of six constituent lenses.

As explained above, the imaging lens according to this embodiment of the present invention enables photographing over a wide field of view of more than 80 degrees, and achieving high-resolution optical system lens which corrects aberrations properly. Also, compactness of the imaging lens is achieving so that a ratio of total track length TTL to twice the maximum image height ih (TTL/2ih) attains less than 1.0, and bright imaging lens system is obtained with an F-value of 2.1 to 2.5.

Table 17 shows value of conditional expressions in relation to Examples 1 to 16.

TABLE 17

| | Example1 | Example2 | Example3 | Example4 | Example5 | Example6 | Example7 | Example8 |
|---|---|---|---|---|---|---|---|---|
| |r1/f| | 18.38 | 7.37 | 44.09 | 41.42 | 36.71 | 2.63 | 2.54 | 18.71 |
| f1/f | 3.20 | 2.92 | 1.25 | 3.31 | 7.07 | 3.59 | 4.69 | 3.32 |

TABLE 17-continued

|  | | | | | | | | |
|---|---|---|---|---|---|---|---|---|
| (r3 + r4)/(r3 − r4) | −0.03 | −0.06 | 0.83 | 0.46 | 0.23 | 0.44 | 0.28 | −0.02 |
| \|f4/f\| | 4.15 | 24.35 | 7.89 | 1.04 | 1.32 | 6.50 | 7.76 | 6.27 |
| vd1 | 55.57 | 55.57 | 55.57 | 55.57 | 55.57 | 55.57 | 55.57 | 55.57 |
| vd2 | 55.57 | 55.57 | 55.57 | 55.57 | 55.57 | 55.57 | 55.57 | 55.57 |
| vd3 | 25.58 | 25.58 | 25.58 | 25.58 | 25.58 | 23.97 | 23.97 | 23.97 |
| vd4 | 25.58 | 25.58 | 25.58 | 25.58 | 25.58 | 23.97 | 23.97 | 23.97 |
| vd5 | 56.16 | 56.16 | 56.16 | 56.16 | 56.16 | 56.16 | 56.16 | 56.16 |
| vd6 | 56.16 | 56.16 | 56.16 | 56.16 | 56.16 | 56.16 | 56.16 | 56.16 |
| ih/f | 0.88 | 0.88 | 0.88 | 0.88 | 0.88 | 1.01 | 0.96 | 0.92 |
| f2/f3 | −0.81 | −0.85 | −1.36 | −0.58 | −0.55 | −0.74 | −0.72 | −0.76 |
| f5/f6 | −0.99 | −1.11 | −1.02 | −0.77 | −0.79 | −0.81 | −0.83 | −1.04 |

|  | Example9 | Example10 | Example11 | Example12 | Example13 | Example14 | Example15 | Example16 |
|---|---|---|---|---|---|---|---|---|
| \|r1/f\| | 2.92 | 3.39 | 3.27 | 2.18 | 0.85 | 0.91 | 1.36 | 1.71 |
| f1/f | −60.16 | −7.82 | 2.88 | 9.39 | 4.56 | 3.67 | 1.59 | 2.80 |
| (r3 + r4)/(r3 − r4) | 0.00 | −0.21 | 0.13 | −0.30 | −0.32 | −0.39 | −0.29 | −0.32 |
| \|f4/f\| | 2.39 | 132.38 | 14.67 | 2.33 | 2.57 | 2.67 | 1.58 | 2.20 |
| vd1 | 55.57 | 55.57 | 55.57 | 55.66 | 55.66 | 55.66 | 55.66 | 55.66 |
| vd2 | 55.57 | 55.57 | 55.57 | 55.66 | 55.66 | 55.66 | 55.66 | 55.66 |
| vd3 | 23.97 | 23.97 | 23.97 | 25.58 | 23.97 | 23.97 | 23.97 | 23.97 |
| vd4 | 56.16 | 56.16 | 23.97 | 55.57 | 55.57 | 55.57 | 55.66 | 55.57 |
| vd5 | 56.16 | 56.16 | 56.16 | 25.58 | 25.58 | 25.58 | 25.58 | 23.25 |
| vd6 | 56.16 | 56.16 | 56.16 | 55.66 | 55.66 | 25.58 | 25.58 | 25.58 |
| ih/f | 0.89 | 0.88 | 0.88 | 0.91 | 0.86 | 0.86 | 0.86 | 0.86 |
| f2/f3 | −0.76 | −0.63 | −0.87 | −0.89 | −0.61 | −0.52 | −1.66 | −0.75 |
| f5/f6 | −0.95 | −1.05 | −1.01 | −1.30 | −2.10 | −1.95 | −1.40 | −1.54 |

According to the imaging lens composed of six constituent lenses related to the present invention, there is provided an imaging lens which meets the demand for a wide field of view while maintaining compactness of the lens and the demand for high resolution. Particularly if the imaging lens is applied to high-functional products such as smart TV and 4K TV, to information terminal devices such as game console and PC, and to mobile terminal devices such as smart phone, mobile phone, and PDA (Personal Digital Assistant) reducing compactness and size and thickness, the imaging lens can enhance camera performance of the products.

EXPLANATION OF THE SYMBOLS

ST Aperture stop
L1 First lens
L2 Second lens
L3 Third lens
L4 Fourth lens
L5 Fifth lens
L6 Sixth lens
ih Maximum image height

What is claimed is:

1. An imaging lens for a solid-state imaging sensor, comprising, in order from an object side to an image side of the imaging lens:
   a first lens having positive refractive power;
   a second lens having positive refractive power;
   a third lens having negative refractive power;
   a fourth lens having positive or negative refractive power and aspheric surfaces facing the object side and the image side;
   a fifth lens having positive refractive power; and
   a sixth lens having negative refractive power and aspheric surfaces facing the object side and the image side;
   wherein conditional expressions (1), and (9) to (12) below are satisfied:

$$0.84 < |r1/f| \quad (1)$$

$$20 < vd4 < 30 \quad (9)$$

$$50 < vd5 < 80 \quad (10)$$

$$50 < vd6 < 80 \quad (11)$$

$$0.80 < ih/f < 1.1 \quad (12)$$

where
   f: overall focal length of the imaging lens,
   r1: curvature radius of an object-side surface of the first lens,
   vd4: Abbe number of the fourth lens at d-ray,
   vd5: Abbe number of the fifth lens at d-ray,
   vd6: Abbe number of the sixth lens at d-ray, and
   ih: maximum image height.

2. The imaging lens according to claim 1, wherein the second lens has convex surfaces facing the object side and the image side, and a conditional expression (4) below is satisfied:

$$-0.40 < (r3+r4)/(r3-r4) < 0.90 \quad (4)$$

where
   r3: curvature radius of an object-side surface of the second lens, and
   r4: curvature radius of an image-side surface of the second lens.

3. The imaging lens according to claim 1, wherein the third lens has a concave surface facing the image side and aspheric surfaces facing the object side and the image side, the fifth lens has a convex surface facing the image side and aspheric surfaces facing the object side and the image side, and an image-side surface of the sixth lens is concave and has a pole point separated from an optical axis of the imaging lens.

4. The imaging lens according to claim 1, wherein a conditional expression (2) below is satisfied:

$$1.0 < f1/f \quad (2)$$

where
   f1: focal length of the first lens.

5. The imaging lens according to claim 4, wherein the fourth lens satisfies a conditional expression (5) below:

$$0.8 < |f4/f| \quad (5)$$

where f4: focal length of the fourth lens.

6. The imaging lens according to claim 1, wherein a conditional expression (13) below is satisfied:

$$-1.7<f2/f3<-0.5 \quad (13)$$

where f2: focal length of the second lens, and f3: focal length of the third lens.

7. The imaging lens according to claim 1, wherein a conditional expression (14) below is satisfied:

$$-2.3<f5/f6<-0.6 \quad (14)$$

where f5: focal length of the fifth lens, and f6: focal length of the sixth lens.

8. The imaging lens according to claim 1, wherein the first lens, the second lens, and the third lens respectively satisfy conditional expressions (6) to (8) below:

$$50<vd1<80 \quad (6)$$

$$50<vd2<80 \quad (7)$$

$$20<vd3<30 \quad (8)$$

where vd1: Abbe number of the first lens at d-ray, vd2: Abbe number of the second lens at d-ray, and vd3: Abbe number of the third lens at d-ray.

9. An imaging lens for a solid-state imaging sensor, comprising, in order from an object side to an image side of the imaging lens:

a first lens having positive or negative refractive power;

a second lens having positive refractive power and convex surfaces facing the object side and the image side;

a third lens that is a meniscus lens having a concave surface facing the image side;

a fourth lens that is a meniscus lens having aspheric surfaces facing the object side and the image side;

a fifth lens; and a sixth lens having negative refractive power and aspheric surfaces facing the object side and the image side, wherein conditional expressions (6), (11), and (12a) below are satisfied:

$$50<vd1<80 \quad (6)$$

$$50<vd6<80 \quad (11)$$

$$0.85<ih/f<1.1 \quad (12a)$$

where vd1: Abbe number of the first lens at d-ray, vd6: Abbe number of the sixth lens at d-ray, ih: maximum image height, and f: overall focal length of the imaging lens.

10. The imaging lens according to claim 9, wherein the second lens has convex surfaces facing the object side and the image side, and a conditional expression (4) below is satisfied:

$$-0.40<(r3+r4)/(r3-r4)<0.90 \quad (4)$$

where r3: curvature radius of an object-side surface of the second lens, and r4: curvature radius of an image-side surface of the second lens.

11. The imaging lens according to claim 9, wherein the fourth lens satisfies a conditional expression (5) below:

$$0.8<|f4/f| \quad (5)$$

where f4: focal length of the fourth lens.

12. The imaging lens according to claim 9, wherein a conditional expression (13) below is satisfied:

$$-1.7<f2/f3<-0.5 \quad (13)$$

where f2: focal length of the second lens, and f3: focal length of the third lens.

13. The imaging lens according to claim 9, wherein a conditional expression (14) below is satisfied:

$$-2.3<f5/f6<-0.6 \quad (14)$$

where f5: focal length of the fifth lens, and f6: focal length of the sixth lens.

14. The imaging lens according to claim 9, wherein the second lens and the third lens respectively satisfy conditional expressions (7) and (8) below:

$$50<vd2<80 \quad (7)$$

$$20<vd3<30 \quad (8)$$

where vd2: Abbe number of the second lens at d-ray, and vd3: Abbe number of the third lens at d-ray.

15. An imaging lens for a solid-state imaging sensor, comprising, in order from an object side to an image side of the imaging lens:

a first lens having positive refractive power;

a second lens having positive refractive power and convex surfaces facing the object side and the image side;

a third lens;

a fourth lens having aspheric surfaces facing the object side and the image side;

a fifth lens; and a sixth lens that is a meniscus lens having negative refractive power and aspheric surfaces facing the object side and the image side, wherein a conditional expression (12a) below is satisfied:

$$0.85<ih/f<1.1 \quad (12a)$$

where ih: maximum image height, and f: overall focal length of the imaging lens.

16. The imaging lens according to claim 15, wherein the second lens has convex surfaces facing the object side and the image side, and a conditional expression (4) below is satisfied:

$$-0.40<(r3+r4)/(r3-r4)<0.90 \quad (4)$$

where r3: curvature radius of an object-side surface of the second lens, and r4: curvature radius of an image-side surface of the second lens.

17. The imaging lens according to claim 15, wherein the third lens has a concave surface facing the image side and aspheric surfaces facing the object side and the image side, the fifth lens has a convex surface facing the image side and aspheric surfaces facing the object side and the image side, and an image-side surface of the sixth lens is concave and has a pole point separated from an optical axis of the imaging lens.

18. The imaging lens according to claim 15, wherein the fourth lens satisfies a conditional expression (5) below:

$$0.8 < |f4/f| \tag{5}$$

where
f4: focal length of the fourth lens.

19. The imaging lens according to claim 15, wherein a conditional expression (13) below is satisfied:

$$-1.7 < f2/f3 < -0.5 \tag{13}$$

where
f2: focal length of the second lens
f3: focal length of the third lens.

20. The imaging lens according to claim 15, wherein the first lens, the second lens, and the third lens respectively satisfy conditional expressions (6) to (8) below:

$$50 < vd1 < 80 \tag{6}$$

$$50 < vd2 < 80 \tag{7}$$

$$20 < vd3 < 30 \tag{8}$$

where
vd1: Abbe number of the first lens at d-ray,
vd2: Abbe number of the second lens at d-ray, and
vd3: Abbe number of the third lens at d-ray.

* * * * *